(12) United States Patent
Shimaoka et al.

(10) Patent No.: US 7,213,944 B2
(45) Date of Patent: May 8, 2007

(54) LIGHT SOURCE APPARATUS, LIGHTING APPARATUS AND PROJECTION DISPLAY APPARATUS

(75) Inventors: Yusaku Shimaoka, Osaka (JP); Shu Namba, Osaka (JP); Kazunori Tanabe, Okayama (JP)

(73) Assignee: Matsushita Electric Industrial Co., Ltd.

( * ) Notice: Subject to any disclaimer, the term of this patent is extended or adjusted under 35 U.S.C. 154(b) by 0 days.

(21) Appl. No.: 10/553,489

(22) PCT Filed: Apr. 15, 2004

(86) PCT No.: PCT/JP2004/005422

§ 371 (c)(1),
(2), (4) Date: Oct. 17, 2005

(87) PCT Pub. No.: WO2004/092823

PCT Pub. Date: Oct. 28, 2004

(65) Prior Publication Data

US 2006/0203497 A1    Sep. 14, 2006

(30) Foreign Application Priority Data

Apr. 18, 2003    (JP) ............................ 2003-114162

(51) Int. Cl.
*F21V 7/00* (2006.01)

(52) U.S. Cl. .................. 362/299; 362/298; 362/302

(58) Field of Classification Search ............... 362/298, 362/299, 237, 302
See application file for complete search history.

(56) References Cited

U.S. PATENT DOCUMENTS

| 4,956,759 | A | | 9/1990 | Goldenberg et al. |
| 5,075,827 | A | * | 12/1991 | Smith .......................... 362/221 |
| 5,526,237 | A | * | 6/1996 | Davenport et al. ......... 362/551 |
| 6,224,217 | B1 | * | 5/2001 | Tanaka ......................... 353/94 |
| 6,547,422 | B2 | * | 4/2003 | Tiao et al. ................... 362/298 |

FOREIGN PATENT DOCUMENTS

| JP | 01-122501 A | 5/1989 |
| JP | 05-040223 | 2/1993 |
| JP | 2543260 | 7/1996 |
| JP | 2730782 | 12/1997 |
| JP | 2000-171901 | 6/2000 |
| JP | 3151734 | 1/2001 |
| JP | 2002-258212 | 9/2002 |
| JP | 3350003 | 9/2002 |

OTHER PUBLICATIONS

International Search Report for PCT/JP 2004/005422, dated Jun. 1, 2004.

* cited by examiner

*Primary Examiner*—Laura Tso
(74) *Attorney, Agent, or Firm*—RatnerPrestia

(57) ABSTRACT

A light source apparatus includes a lamp, an ellipsoidal mirror collecting a part of light radiated from a light transmission plane of the lamp, and a spherical mirror collecting another part of the light radiated from a light transmission plane not collected by the ellipsoidal mirror and reflecting it on the ellipsoidal mirror, in which a reflection plane of the ellipsoidal mirror and the reflection plane of the spherical mirror are in a form of non-rotation symmetry to an optical axis connecting a focal position F1 corresponding to a source of luminescence of the lamp to a focal position F2 of the light collected by the ellipsoidal mirror respectively. The distance between the reflection plane of the spherical mirror and the source of luminescence of the lamp is shorter than the distance between the source of luminescence and the focus of the light collected by the ellipsoidal mirror, and a part of the reflection plane of the ellipsoidal mirror is formed around the optical axis.

14 Claims, 19 Drawing Sheets ns LIGHT SOURCE APPARATUS, LIGHTING
APPARATUS AND PROJECTION DISPLAY
APPARATUS

THIS APPLICATION IS A U.S. NATIONAL PHASE APPLICATION OF PCT INTERNATIONAL APPLICATION PCT/JP2004/005422.

TECHNICAL FIELD

The present invention relates to a light source apparatus having light generating means and a concave mirror, a lighting apparatus and a projection display apparatus.

BACKGROUND ART

In recent years, attention is being given to a projection display apparatus using various light modulation devices as a large-screen projection video apparatus. In the case of performing a large-screen display, brightness of a displayed image can be named as the most important item.

Thus, attention is being given to a multi-lamp illumination system using multiple lamps and capable of improving optical output as the projection display apparatus. As for the brightness, it is important to illuminate the light modulation device as an image display device with as little loss of luminous fluxes radiated from the lamps as possible, that is, as efficiently as possible. For that reason, it is desirable to improve efficiency of the light source apparatus of collecting lamp radiation light.

FIG. 11 shows a conventional multi-lamp optical system having two light source apparatuses configured by the lamp and concave mirror provided therein. The light radiated from a light source apparatus 1 gets incident on a hollow rod integrator 2 made of glass poles or mirrors glued together. It repeats total reflection inside the glass in the case of the glass poles, or repeats reflection in the case of the type having the mirrors glued together. It is possible, by means of the reflection inside the rod integrator 2, to create the luminous fluxes of homogeneous in-plane brightness on an emission opening plane of the rod integrator 2. Furthermore, it is possible, with a relay lens 3 after this, to focus the luminous fluxes of high in-plane homogeneousness on a light modulation device 4 of performing an image display so as to display the image provided on a screen by a projection lens as the image of which in-screen brightness is highly homogeneous.

Next, as for improvement in the efficiency of the conventional light source apparatus of collecting lamp radiation light, a basic configuration of the light source apparatus as a first conventional example is shown in FIG. 12 (refer to Japanese Patent No. 2543260 and Japanese Patent No. 3151734 for instance). In the case of this light source apparatus, the light radiated from light-transmitting planes 5a and 5b of a light-emitting portion 5 of the lamp is collected on a focus X by a first concave mirror 6 having an ellipsoidal or paraboloidal reflection plane form. The radiation light from the light-transmitting planes 5a and 5b of the light-emitting portion 5 of the lamp not collected by the first concave mirror 6 is reflected on a second concave mirror 7 consisting of a spherical mirror for instance and having its reflection plane facing the reflection plane of the first concave mirror 6, and is then returned to the vicinity of the light-emitting portion 5 of the lamp so as to be collected on the focus X by the first concave mirror 6.

Thus, the first concave mirror 6 and the second concave mirror 7 are used in a state of having their reflection planes facing each other, the second concave mirror 7 having the outermost diameter larger than the outermost diameter in a vertical direction to an optical axis of the first concave mirror 6, that is, a straight line connecting a luminescence center 5c of the light-emitting portion 5 to the focus X. The light radiated from the light-emitting portion 5 of the lamp is thereby taken in as much as possible so as to be collected by the first concave mirror 6.

The basic configuration of the light source apparatus as a second conventional example is shown in FIG. 15 (refer to Japanese Patent No. 2730782 and Japanese Patent No. 3350003 for instance). In the case of this light source apparatus, a light source 10 of the lamp is placed on a focus Y of an ellipsoidal mirror or paraboloidal reflecting mirror as a first concave mirror 8. The first concave mirror 8 is provided at an angle capable of reflecting all the radiation light from a light-transmitting plane 10a of the light source 10. This light source apparatus coincides with the first conventional example in that the light radiated from the light-transmitting planes 10a of the light source 10 and reflected on the spherical mirror as a second concave mirror 9 is returned to the vicinity of the focus of the first concave mirror 8 and as much light radiated from a light-transmitting portion 10 as possible is thus taken in together with the light radiated from the light-transmitting plane 10b and directly collected by the first concave mirror 8.

However, they are different in that the first conventional example has the opening of the second concave mirror 7 in a vertical plane against an optical axis direction of the first concave mirror 6 whereas the second conventional example has the second concave mirror 9 placed in a horizontal direction against the direction of the optical axis of the first concave mirror 8, that is, the straight line connecting a luminescence center 10c of the light-emitting portion 10 of the lamp to the focus Y.

As shown in FIG. 11, the conventional multi-lamp optical system has the configuration in which the light radiated from multiple light source apparatuses gets incident on the rod integrator 2 which is homogeneous lighting means. However, a transmissive/reflective liquid crystal of displaying the image and the light modulation device called a DMD (Digital Micro-mirror Device) have a luminous flux incident angle range capable of substantially modulating the light and an image display effective area capable of displaying the image. For this reason, due to the relation of Helmholtz-Lagrange which is a basic formula of imaging optics, an output angle range of the light according to the size of an outgoing side opening 2b of the rod integrator 2 in an imaging relation with the relay lens 3 is uniquely decided by the relay lens 3.

In this case, if the outgoing side opening and the incident side opening of the rod integrator 2 are of an equal size, the output angle range is equal to the incident angle range. If the outgoing side opening and the incident side opening are of different sizes, the incident angle range is in accordance with the size of the incident side opening induced by the relation of Helmholtz-Lagrange, and so only the luminous flux within this angle range is projected onto the screen via the rod integrator 2, relay lens 3, light modulation device 4 and projection lens.

For this reason, in the case of the light source apparatus having a single concave mirror 1 capable of collecting more lamp radiation light, the incident angle range of the rod integrator 2 is limited. Therefore, there is a problem that a distance between the concave mirror 1 and an incident side opening 2a of the rod integrator 2 becomes long and an optical spot size formed by the concave mirror 1 becomes large so that an amount of light to be taken in by the opening of the rod integrator 2 decreases.

As with the light source apparatus of the conventional multi-lamp optical system shown in FIG. 11, the light source apparatus of the first conventional example shown in FIG. 12 is in a form of rotation symmetry to the optical axis of the first concave mirror, that is, the straight line connecting the luminescence center 5c of the light-emitting portion 5 of the lamp to the focus X. It has a problem that, in the case of forming a similar multi-lamp optical system, the amount of light to be taken in by the opening of the rod integrator 2 decreases. It also has a problem that its outer shape becomes large.

The light source apparatus of the second conventional example shown in FIG. 15 is in a form of non-rotation asymmetry to the optical axis of the first concave mirror, that is, the straight line connecting the luminescence center 10c of the light-emitting portion 10 of the lamp to the focus Y. Its outer shape can be smaller than that of the first conventional example. The luminous fluxes formed by collection of light can also be of non-rotation symmetry, and it is possible, even in the multi-lamp optical system of FIG. 11, to reduce the distance between the first concave mirror 8 corresponding to the first concave mirror 6 and the incident side opening 2a of the rod integrator 2.

However, the light source apparatus of the second conventional example shown in FIG. 15 has the following problem. The reflection plane having the second concave mirror 9 formed thereon reflects all the light radiated from the light-transmitting plane 10a as shown in FIG. 15. Nevertheless, all the reflected light is not collected by the first concave mirror 8, but a part of it is radiated outside so as to become an impediment to light collection efficiency.

To collect all the reflected light of the second concave mirror 9 on the focus Y, it is necessary to expand the reflection plane of the first concave mirror 8 by an equivalent of an area 150. However, this leads to a larger size of the light source apparatus so that the light collection efficiency and the larger size of the light source apparatus will be in a trade-off relation.

The light radiated from a lamp 5 and directly reaching the first concave mirror 6 in an upper half in the light source apparatus of the first conventional example of FIG. 12 is taken in by the second concave mirror 9 in the light source apparatus of the second conventional example of FIG. 15. In this case, the light reflected on the second concave mirror 9 passes through the vicinity of the light-emitting portion 10 of the lamp again so as to get to the first concave mirror 8. In the case of using a metal halide lamp or a mercury lamp as the lamp, much of the light passing through the light-emitting portion again is lost due to light absorption and light scattering of light-emitting materials and materials configuring the lamp. Thus, it has a problem that the amount of luminous fluxes emitted to the focus Y is consequently reduced and optical usable efficiency is lowered as the entire light source apparatus.

The present invention was made in order to solve these problems of the conventional examples, and an object thereof is to provide the light source apparatus of which optical usable efficiency is not lowered by miniaturizing it and the lighting apparatus and projection display apparatus of higher efficiency and capable of miniaturization by having the light source apparatus.

DISCLOSURE OF THE INVENTION

The $1^{st}$ aspect of the present invention is a light source apparatus comprising:
light generating means;
a first concave mirror of collecting a part of light radiated from the light generating means; and
a second concave mirror of collecting another part of the light radiated from the light generating means not collected by the first concave mirror and reflecting it on the first concave mirror,
wherein a reflection plane of the first concave mirror and a reflection plane of the second concave mirror are in a form of rotational asymmetry to a reference axis connecting a source of luminescence of the light generating means to a focus of the light collected by the first concave mirror respectively;
a distance between the reflection plane of the second concave mirror and the source of luminescence is shorter than the distance between the source of luminescence and the focus of the light collected by the first concave mirror; and
a part of the reflection plane of the first concave mirror is formed around the reference axis.

The $2^{nd}$ aspect of the present invention is the light source apparatus according to the $1^{st}$ aspect of the present invention, wherein the first concave mirror has one or a plurality of quadratic surfaces as the reflection plane.

The $3^{rd}$ aspect of the present invention is the light source apparatus according to the $2^{nd}$ aspect of the present invention, wherein the quadratic surface of the first concave mirror is a part of an ellipsoidal surface, and one of the focuses of the ellipsoidal surface substantially coincides with the source of luminescence of the light generating means while the other coincides with the focus of the light collected by the first concave mirror.

The $4^{th}$ aspect of the present invention is the light source apparatus according to the $1^{st}$ aspect of the present invention, wherein the second concave mirror has one or a plurality of quadratic surfaces as the reflection plane.

The $5^{th}$ aspect of the present invention is the light source apparatus according to the $4^{th}$ aspect of the present invention, wherein the quadratic surfaces of the second concave mirror are a part of a spherical surface and a center of the spherical surface substantially coincides with the source of luminescence of the light generating means.

The $6^{th}$ aspect of the present invention is the light source apparatus according to the $1^{st}$ aspect of the present invention, wherein the reflection plane of the first concave mirror is located closer to the source of luminescence than the reflection plane of the second concave mirror; and
the following relations are satisfied if, when a focusing angle of the first concave mirror is divided in two by a plane including the reference axis, a larger angle is $\alpha$, a smaller angle is $\beta$, a maximum angle of the light radiated from the light generating means to the first concave mirror and the second concave mirror is $\gamma$, and the focusing angle of the second concave mirror is $\theta$:

$\alpha > \beta > 0$  (Formula 1)

$\alpha + \beta \geq 180$ degrees  (Formula 2)

$0 < \theta \leq \gamma - \beta.$  (Formula 3)

The $7^{th}$ aspect of the present invention is the light source apparatus according to the $1^{st}$ aspect of the present invention, wherein the reflection plane of the second concave mirror is located closer to the source of luminescence than the reflection plane of the first concave mirror; and the following relations are satisfied if, when a focusing angle of the first concave mirror is divided in two by a plane including the reference axis, a larger angle is α, a smaller angle is β, a maximum angle of the light radiated from the light generating means to the first concave mirror and the second concave mirror is γ, and the focusing angle of the second concave mirror is θ:

$$\alpha > \beta > 0 \quad \text{(Formula 1)}$$

$$\alpha\beta \geq 180 \text{ degrees} \quad \text{(Formula 2)}$$

$$0 < \theta \leq 180 \text{ degrees.} \quad \text{(Formula 4)}$$

The 8th aspect of the present invention is the light source apparatus according to the 7th aspect of the present invention, wherein the second concave mirror is placed in luminous fluxes formed by the first concave mirror.

The 9th aspect of the present invention is the light source apparatus according to the 1st aspect of the present invention, wherein the light generating means is a lamp having a vessel body of accommodating the source of luminescence;

the vessel body has a spherical vessel portion of transmitting radiation light from the source of luminescence and a pair of ends projecting from the spherical vessel portion; and the pair of ends is provided around the reference axis.

The 10th aspect of the present invention is the light source apparatus according to the 9th aspect of the present invention, wherein the spherical vessel portion has a first opposed plane opposed to the reflection plane of the first concave mirror and a second opposed plane opposed to the reflection plane of the first concave mirror and the reflection plane of the second concave mirror; and the part of the reflection plane of the first concave mirror is at least opposed to the second opposed plane.

The 11th aspect of the present invention is a lighting apparatus comprising:

the light source apparatus according to the 1st aspect of the present invention; and lens means placed at a position optically connecting with the focus of the light collected by the first concave mirror of the light source apparatus and converting the light emitted from the light source apparatus substantially to parallel light.

The 12th aspect of the present invention is the lighting apparatus according to the 11th aspect of the present invention, wherein the lens means is a rod integrator.

The 13th aspect of the present invention is the lighting apparatus according to the 11th aspect of the present invention, wherein the lens means is a lens array.

The 14th aspect of the present invention is the lighting apparatus according to the 11th aspect of the present invention, wherein there are a plurality of the light source apparatuses placed so that the respective reference axes thereof coincide in the same plane; and it further comprises light guiding means of guiding the light emitted from the plurality of light source apparatus to the lens means.

The 15th aspect of the present invention is the lighting apparatus according to the 11th aspect of the present invention, wherein the plurality of light source apparatus are placed so that the respective reference axes thereof intersect at one point in space; and the lens means is provided at a position corresponding to the one point.

The 16th aspect of the present invention is the lighting apparatus according to the 15th aspect of the present invention, wherein the plurality of light source apparatus are placed so that the second concave mirrors are mutually opposed.

The 17th aspect of the present invention is the lighting apparatus according to the 15th aspect of the present invention, wherein the plurality of light source apparatus are placed so that the first concave mirrors are mutually opposed.

The 18th aspect of the present invention is a projection display apparatus comprising:

the lighting apparatus according to the 11th aspect of the present invention;

a light modulation device placed at a position optically connecting with the lighting apparatus and modulating the light to form an optical image; and a projection lens of projecting the optical image.

DESCRIPTION OF SYMBOLS

Figure 1:
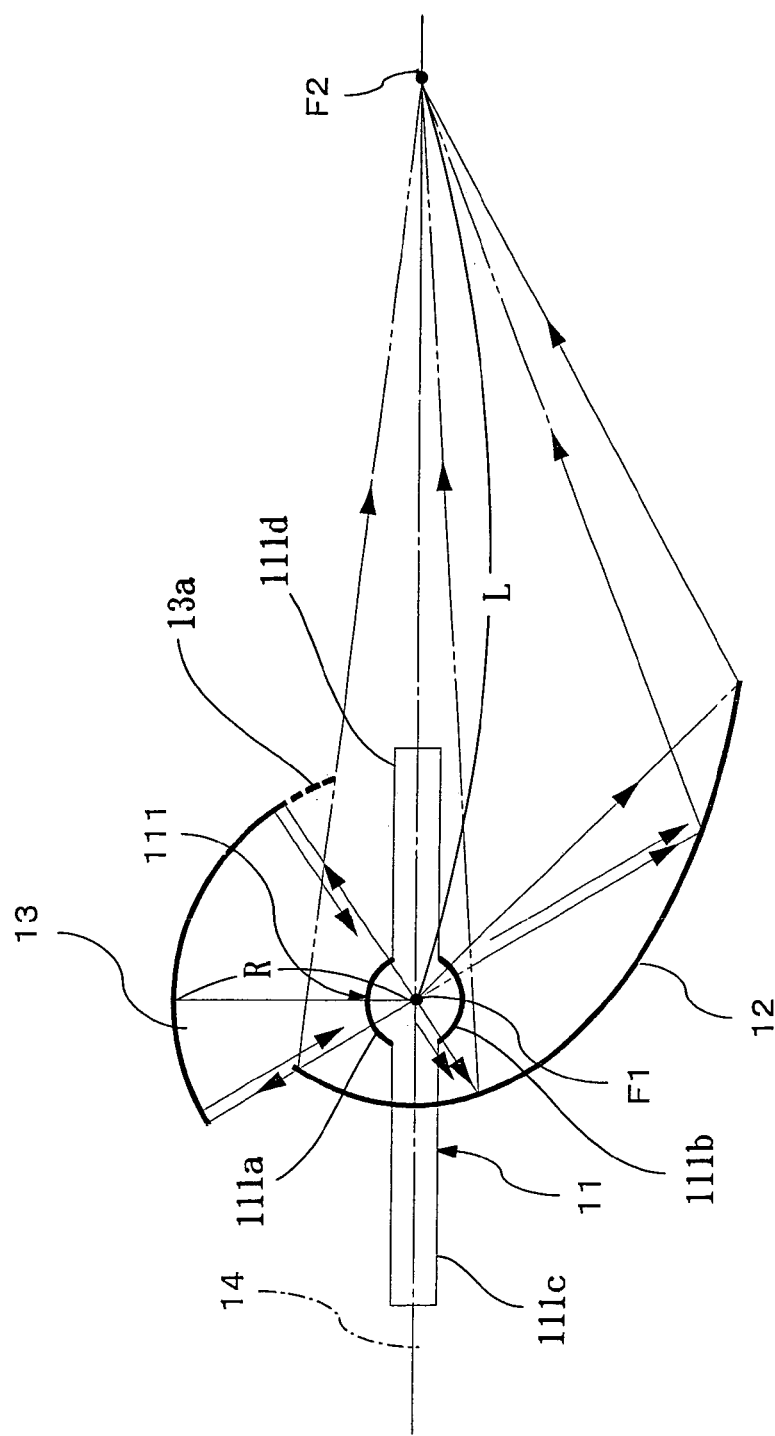
FIG. 1 is a sectional view of describing an overview of a light source apparatus according to a first embodiment of the present invention.

11 Lamp
12 Ellipsoidal mirror
13 Spherical mirror
14 Optical axis
111 Lamp light-emitting portion
100 Light source apparatus
101 Rod integrator
F1 First focal position
F2 Second focal position

BEST MODE FOR CARRYING OUT THE INVENTION

Hereunder, the embodiments of the present invention will be described by referring to the drawings.

FIRST EMBODIMENT

Hereunder, a first embodiment of the present invention will be described by referring to the drawings. FIG. 1 shows an overview configuration of a light source apparatus according to the first embodiment.

This light source apparatus is configured by a lamp (an example of the lamp or light generating means of the present invention) 11, an ellipsoidal mirror (an example of a first concave mirror of the present invention) 12 and a spherical mirror (an example of a second concave mirror of the present invention) 13.

The lamp 11 is configured by a lamp light-emitting portion 111 having a substantially spherical vessel portion including a source of luminescence positioned correspondingly to a focal position mentioned later and generating light, and light transmission planes 111a and 111b containing the source of luminescence and transmitting the light therefrom to the outside, and a pair of ends 111c and 111d including electrodes of the source of luminescence and having a form projecting from the lamp light-emitting portion 111. The vessel portion and ends 111c and 111d of the lamp light-emitting portion 111 are integrally formed from the same vessel body. As for the lamp 11, it is possible to use a xenon lamp having a light-emitting portion form as the source of luminescence very close to a point source and capable of large optical output, a metal halide lamp of high luminous efficiency, a mercury lamp having an ultrahigh voltage in the lamp light-emitting portion (arc tube) when lit up, and a halogen lamp.

Of the two focuses of the reflection plane of the ellipsoidal mirror 12, one is placed to coincide with the source of luminescence of the lamp light-emitting portion 111. Therefore, the light radiated from the light transmission plane 111b and collected by the ellipsoidal mirror 12 is focused on the outgoing opening side of the ellipsoidal mirror 12 so as to form an optical spot on the other focus. Here, if the position of the focus coinciding with the source of luminescence of the lamp light-emitting portion 111 is a focal position F1 and the position of the focus at which the optical spot is formed is a focal position F2, the ellipsoidal mirror 12 is in a form of non-rotation symmetry to an optical axis 14 thereof, that is, a reference axis connecting the focal position F1 to the focal position F2. Furthermore, a part of the reflection plane of the ellipsoidal mirror 12 exists around the optical axis 14 shown in FIG. 1, and a further part thereof is formed to be opposed to the light transmission plane 111a by going round to the back of a lamp 111.

The spherical mirror 13 is also in the form of non-rotation symmetry to the optical axis 14, and the reflection plane thereof is opposed to the light transmission plane 111a of the lamp light-emitting portion 111 so as to cover a portion without the ellipsoidal mirror 12 in a range reachable by radiation light therefrom. In FIG. 1, the center of the reflection plane of the spherical mirror 13 coincides with the focal position F1. In short, the ellipsoidal mirror 12 can collect the light radiated from the light transmission plane 111b and the light transmission plane 111a, and the spherical mirror 13 has a configuration capable of reflecting the light radiated from the light transmission plane 111a.

Furthermore, a distance from the focal position F1 of the ellipsoidal mirror 12 to the reflection plane of the spherical mirror 13, that is, a radius of curvature R of the spherical mirror 13 is shorter than the distance from a focal length of the ellipsoidal mirror 12 having the lamp light-emitting portion 111 to the focal position F2 of the ellipsoidal mirror 12 at which luminous fluxes emitted from the lamp light-emitting portion 111 is collected by the ellipsoidal mirror 12 to form a spot, that is, an inter-focus distance L of the ellipsoidal mirror 12. The optical axis 14 is placed to penetrate the lamp 11, where the ends 111c and 111d are formed around the optical axis 14.

Figure 2:
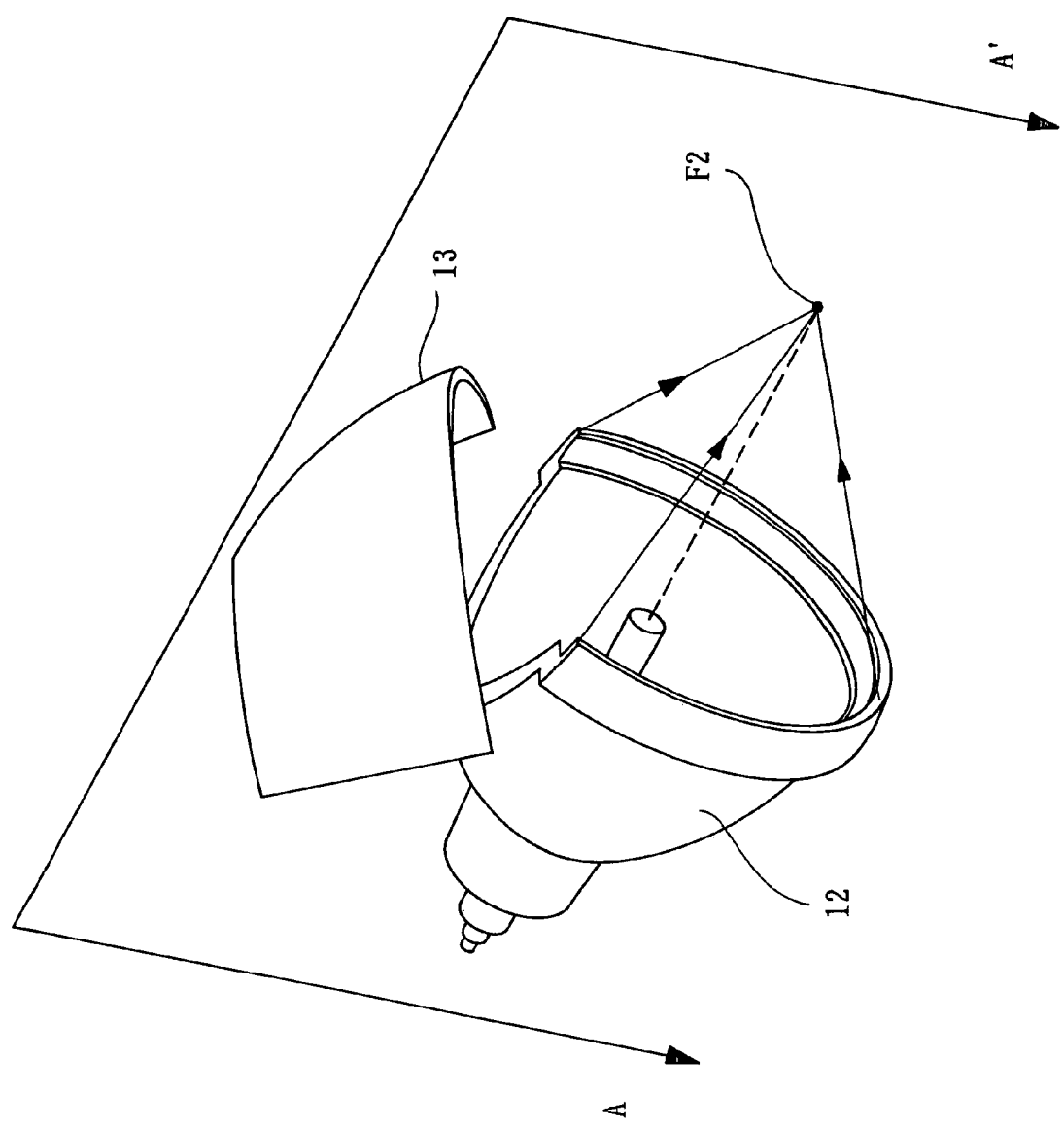
FIG. 2 is a perspective view showing an overview configuration of the light source apparatus according to the first embodiment of the present invention.

FIG. 2 shows a three-dimensional overview form of the light source apparatus. The sectional view of FIG. 1 is based on a line A–A' of FIG. 2. The line A–A' is located in the same plane as the optical axis 14, and divides the light source apparatus in two from overhead.

An action of the light source apparatus shown in FIG. 1 will be described. First, of the luminous fluxes emitted from the lamp light-emitting portion 111, the light reflected on the ellipsoidal mirror 12 is focused on the outgoing opening side of the ellipsoidal mirror 12 so as to form the optical spot on the focal position F2 existing on the outgoing opening side of the ellipsoidal mirror 12. In this case, the luminous flux radiated from the source of luminescence of the lamp light-emitting portion 111 is formed by the light radiated from the light transmission plane 111b and the light transmission plane 111a.

Of the luminous fluxes radiated from the lamp light-emitting portion 111, the light radiated from the light transmission plane 111a and reflected on the spherical mirror 13 is returned to the lamp light-emitting portion 111 of the lamp 11 again. It passes the vicinity of the lamp light-emitting portion 111, and is reflected thereafter on the ellipsoidal mirror 12 so as to be focused on the second focus F2 of the ellipsoidal mirror 12 together with direct light from the lamp light-emitting portion 111.

Thus, the light source apparatus according to this embodiment has the configuration in which the ellipsoidal mirror 12 is in rotation asymmetry to the optical axis 14, where the light directly radiated from the lamp 11 is reflected to form the luminous fluxes in rotation asymmetry and the light radiated from the lamp 11 and not reflected on the ellipsoidal mirror 12 is reflected on the ellipsoidal mirror 12 again by the spherical mirror 13. Therefore, an amount of luminous fluxes close to the luminous fluxes in rotation symmetry is secured even in the case of the luminous fluxes in rotation asymmetry.

Furthermore, the ellipsoidal mirror 12 is formed in rotation asymmetry to the optical axis 14, and the reflection plane is formed to go round to the back of the lamp light-emitting portion 111 so as to directly collect the light from the same light transmission plane as that reflecting the light reflected on the spherical mirror 13. Thus, it is not necessary for the spherical mirror 13 to reflect all the radiation light from the light transmission plane 111a as with the light source apparatus of the second conventional example of FIG. 15. It is thereby possible to prevent the reflected light from being radiated outside without getting collected so as to obtain a sufficient amount of luminous fluxes without changing a substantial size of the ellipsoidal mirror 12.

Furthermore, the light source apparatus according to this embodiment has the configuration in which the radius of curvature R of the spherical mirror 13 is shorter than the inter-focus distance L of the ellipsoidal mirror 12, which has the effect of keeping the size of the light source apparatus minimum while securing a maximum amount of luminous fluxes. This has the following reason. To be more specific, it is sufficient, just for the sake of improving light collection efficiency, to provide the spherical mirror 13 at a position backed out until its reflection plane substantially coincides with the focal position F2 as a convergent point of outgoing beams emitted from the ellipsoidal mirror 12 and further provide an opening of substantially the same size as a focusing spot at a position corresponding to the focal position F2 on the reflection plane of the spherical mirror 13. In this case, it is possible to collect almost all the light emitted from the lamp light-emitting portion 111 with the spherical mirror 13 and the ellipsoidal mirror 12 so as to obtain the maximum light collection efficiency. However, the size of the light source apparatus itself becomes larger because the radius of curvature of the spherical mirror 13 is fixed even if a focusing angle of the ellipsoidal mirror 12 is changed.

For that reason, according to this embodiment, it is possible, by rendering the radius of curvature R of the spherical mirror 13 shorter than the inter-focus distance L of the ellipsoidal mirror, to strike a balance between improvement in the light collection efficiency and miniaturization of the apparatus.

Next, a description will be given as to conditions of realizing the light source apparatus in non-rotation symmetry to the optical axis 14 having improved optical usable efficiency and in the form not enlarging the size of the spherical mirror 13.

Figure 6:
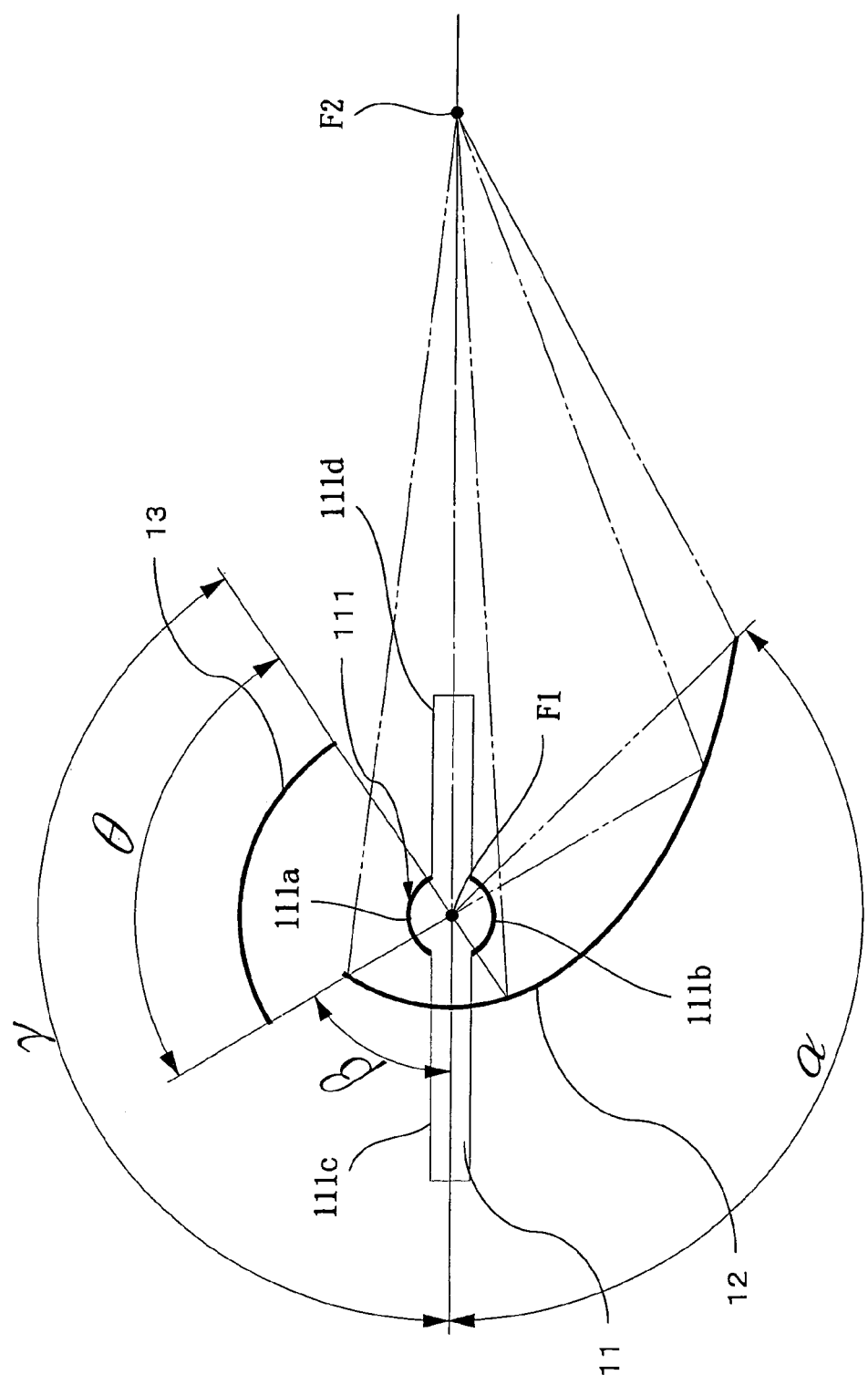
FIG. 6 is a sectional view of describing an overview configuration and action of the light source apparatus according to the first embodiment of the present invention.
Figure 7:
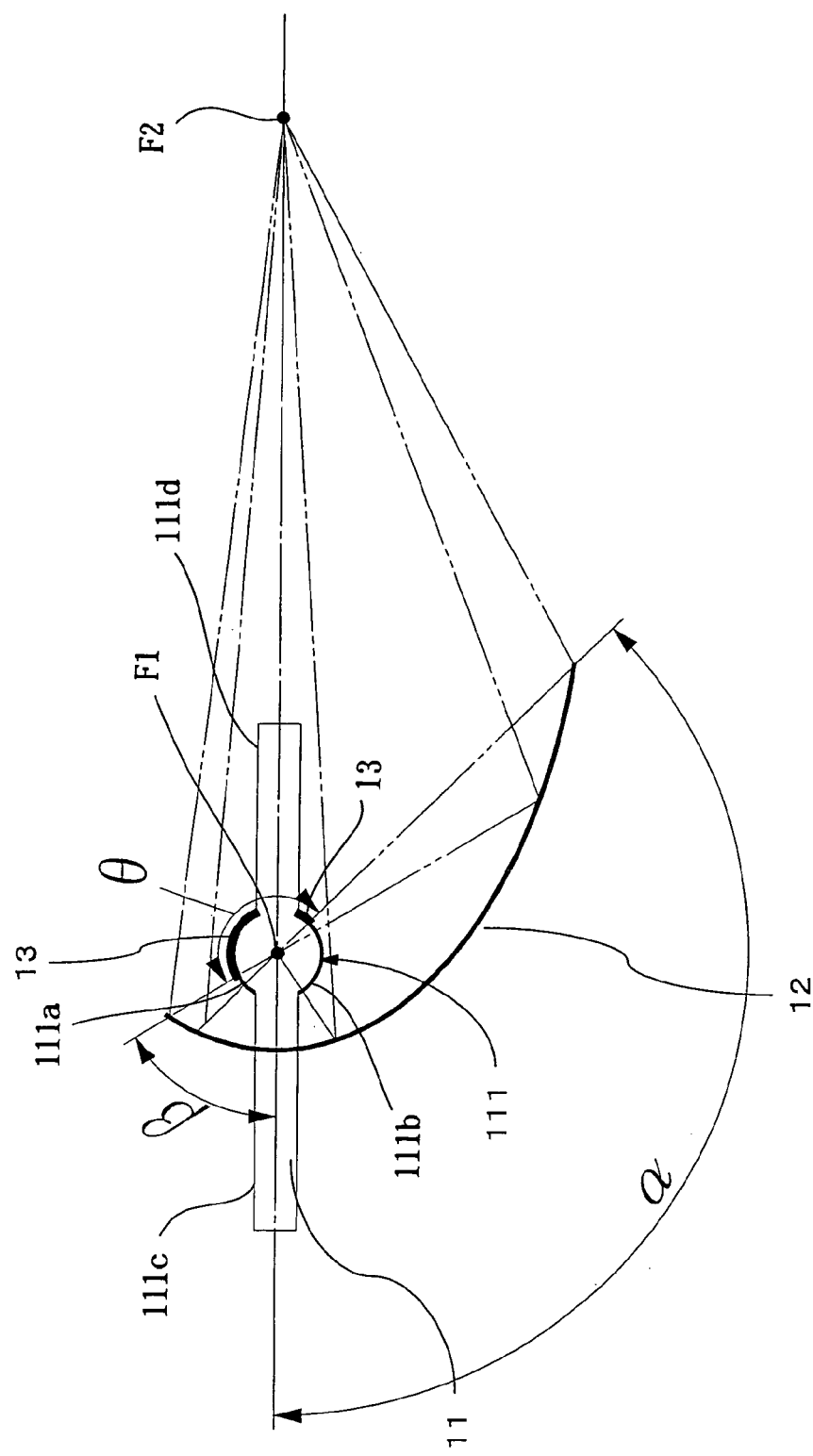
FIG. 7 is a sectional view of describing an overview configuration and action of the light source apparatus according to the first embodiment of the present invention.

FIGS. 6 and 7 show sectional views on a vertical plane at which the angle for the spherical mirror 13 to take in the radiation light from the lamp 111 becomes the largest. To be more specific, the sectional views show the section at which the angle of viewing the spherical mirror 13 from the light source 111 becomes the largest.

The following holds in the case where, of the focusing angles of the ellipsoidal mirror 12 including the optical axis 14 and divided in two at the plane orthogonal to the line A–A' of FIG. 2, the larger one is angle $\alpha$ and the smaller one is angle $\beta$, and a maximum angle of the light radiated from the lamp 11 is $\gamma$, and the range of the focusing angle of the spherical mirror 13 is $\theta$, and if the spherical mirror 13 is outside the reflected light of the ellipsoidal mirror 12 within the range scarcely blocking the light reflected on the ellipsoidal mirror 12 as shown in FIG. 6, that is, if the reflection plane of the ellipsoidal mirror 13 is placed closer to the light source 111 than the reflection plane of the spherical mirror 13.

(Formula 1)

$$\alpha > \beta > 0 \quad (1)$$

(Formula 2)

$$\alpha + \beta \geq 180 \text{ degrees} \quad (2)$$

(Formula 3)

$$0 < \theta \leq \gamma - \beta \quad (3)$$

The reflection plane defined by the angle $\alpha$ reflects the radiation light from the light transmission plane 111b, and the reflection plane defined by the angle $\beta$ reflects the light from the light transmission plane 111a.

It is desirable to satisfy the following in the case where the spherical mirror 13 is formed on a surface of the vessel portion of the lamp light-emitting portion 111 or in proximity thereto within the range scarcely blocking the light reflected on the ellipsoidal mirror 12 as shown in FIG. 7, that is, in the case where the reflection plane of the spherical mirror 13 is placed closer to the light source 111 than the reflection plane of the ellipsoidal mirror 12.

(Formula 1)

$$\alpha > \beta > 0 \quad (1)$$

(Formula 2)

$$\alpha + \beta \geq 180 \text{ degrees} \quad (4)$$

(Formula 4)

$$0 < \theta \leq 180 \text{ degrees} \quad (5)$$

As for the condition of FIG. 6, it is radius of curvature R of the spherical mirror 13<inter-focus distance L of the ellipsoidal mirror 12.

Here, an important point is that $\beta$ is positive. This provides the configuration in which the reflection plane of the ellipsoidal mirror 12 is vertically astride the optical axis 14 on both sides thereof in FIGS. 6 and 7. Furthermore, it provides the configuration in which the reflection plane is opposed not only to the light transmission plane 111b but also to the light transmission plane 111a by straddling the end 111c of the lamp 11. Thus, the ellipsoidal mirror 12 is vertically astride the optical axis 14 on both sides thereof and the reflection plane is opposed not only to the light transmission plane 111b but also to the light transmission plane 111a. It is thereby possible for the ellipsoidal mirror 12 to directly collect the light from the light source 111 at a large angle. The spherical mirror 13 can be small-size since it has only to collect a small amount of the remaining light which cannot be completely collected by the ellipsoidal mirror 12 out of the light from the light transmission plane 111a. Therefore, in this state, the light radiated from the light source 111 and heading for the ellipsoidal mirror 12 without suffering a loss to be focused on the second focus F2 becomes the largest. This involves a relatively small amount of light generating significant loss in the course of directly heading for the spherical mirror 13, getting reflected, passing through the vicinity of the light source 111 and heading for the ellipsoidal mirror 12 until getting reflected on the ellipsoidal mirror 12 where it is focused on the second focus. Thus, the light collection efficiency of the light emitted from the entire light source apparatus is improved in comparison with the conventional examples without substantially changing the size of the ellipsoidal mirror 12.

The formula (1) indicates the condition for the reflection plane of the ellipsoidal mirror 12 to be in non-rotation symmetry to the optical axis 14.

In the case where the relations of the formulas (2) and (4) are not satisfied, the light reflected on the spherical mirror 13 reaches the area in which the reflection plane of the ellipsoidal mirror 12 does not exist so that the optical usable efficiency cannot be improved.

The formulas (3) and (5) indicate the ranges in which the spherical mirror 13 can collect the light.

The formula (3) is the case where the spherical mirror 13 is outside the reflection plane of the ellipsoidal mirror 12 as shown in FIG. 6. Therefore, it shows the range capable of taking in the radiation light from the lamp 11 at the maximum and rendering the angle of the spherical mirror 13 small.

In the case where the spherical mirror 13 is outside the reflection plane of the ellipsoidal mirror 12, the size of the light source apparatus becomes larger than the case where it is in proximity to the vessel surface of the lamp 11 in the example of FIG. 7. As an advantage, however, there is reduction in density of the luminous fluxes emitted from the lamp light-emitting portion 111 and getting incident on the reflection plane of the spherical mirror 13 so that heat resistance required on the reflection plane can be alleviated.

The formula (5) is the case where, as shown in FIG. 7, the spherical mirror 13 is on the lamp vessel surface substantially coinciding with the light transmission plane 111a or in proximity thereto and is placed in the luminous fluxes formed by the ellipsoidal mirror 12. Therefore, the size of the light source apparatus is hardly changed by an angular range of the spherical mirror 13. Thus, it is desirable to provide the angular range placing more importance on the improved efficiency.

In the case of these configurations, it is possible to efficiently emit the lamp outgoing beams radiated in rotation symmetry to the optical axis 14 from the ellipsoidal mirror 12 as the luminous fluxes in non-rotation symmetry to the optical axis 14.

FIG. 1 shows the case of using one piece of the spherical mirror 13. In the case of the ellipsoidal mirror in a form having some locations cut off from the ellipsoidal mirror in rotation symmetry to the optical axis 14, however, it is possible, by using multiple spherical mirrors, to collect the radiation light from the lamp 11 reaching the area not coverable by the ellipsoidal mirror even if the ellipsoidal mirror has a complicated opening form so as to improve the optical usable efficiency of the light source apparatus.

Figure 3:
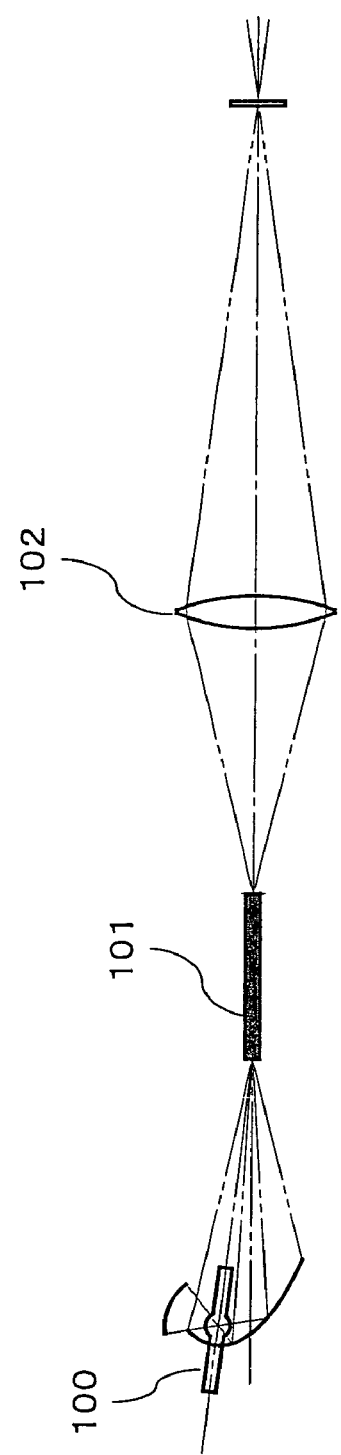
FIG. 3 is a sectional view showing an overview configuration of a lighting apparatus according to the first embodiment of the present invention.

As shown in FIG. 3, it is possible to place a light source apparatus 100, mirrors, a rod integrator 101 made of glass poles or mirrors glued together, and optical means 102 such as a lens of this embodiment at predetermined positions so as to obtain a lighting apparatus of this embodiment of converting the light emitted from the light source apparatus 100 to predetermined approximately parallel light.

Figure 4:
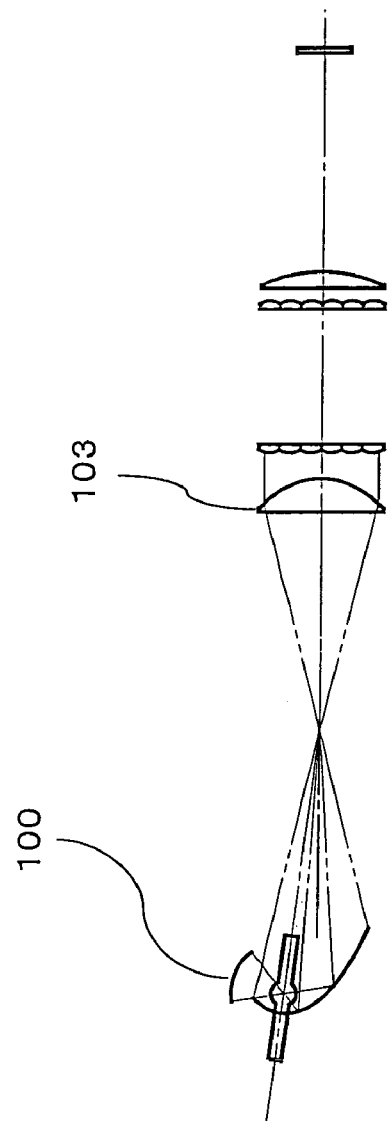
FIG. 4 is a sectional view showing an overview configuration of the lighting apparatus according to the first embodiment of the present invention.

As shown in FIG. 4, it may also be the lighting apparatus using a lens array 103 having multiple lenses two-dimensionally placed rather than the lighting apparatus using the rod integrator having the glass poles or mirrors glued together.

Figure 5:
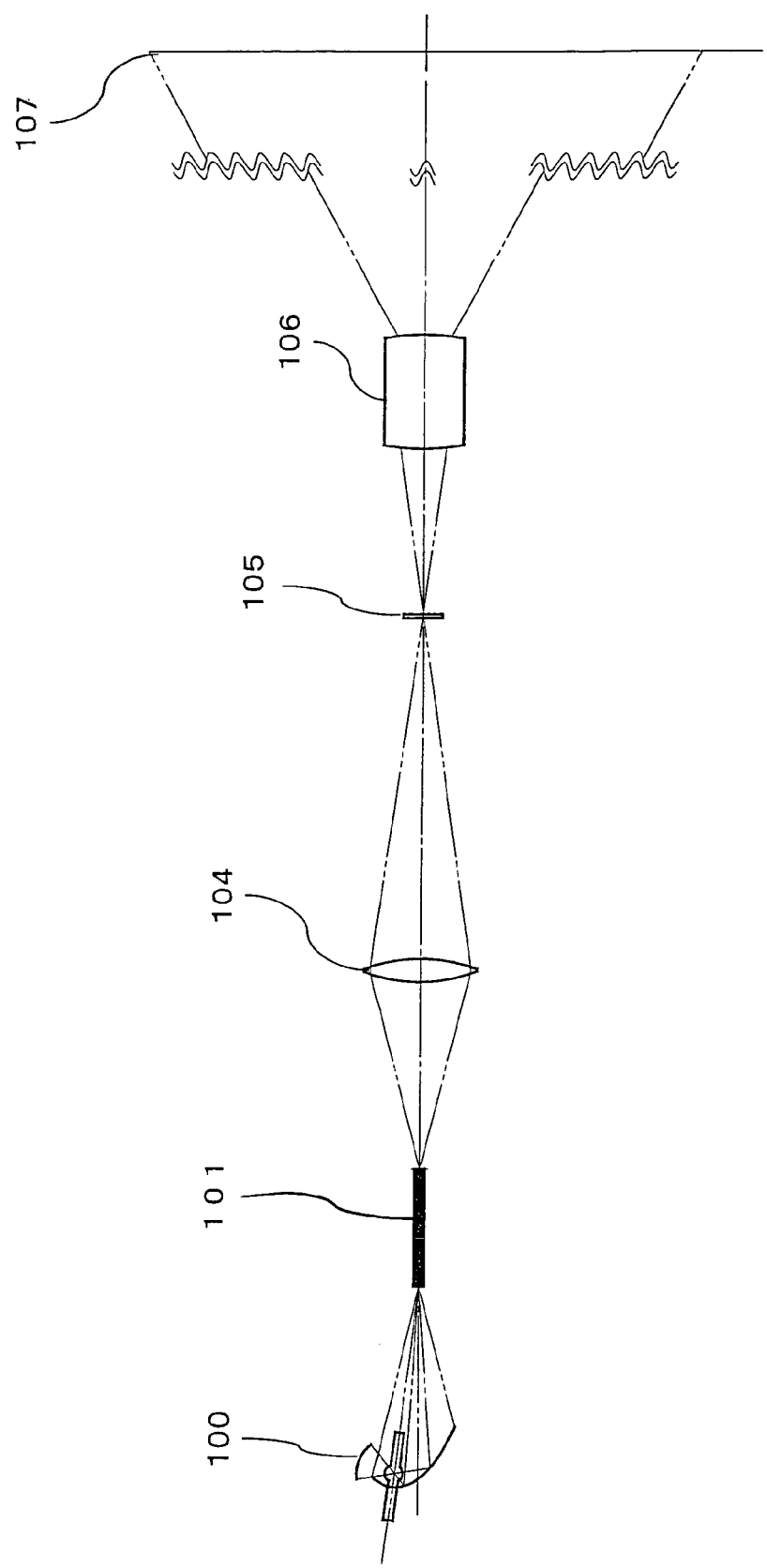
FIG. 5 is a sectional view showing an overview configuration of a projection display apparatus according to the first embodiment of the present invention.

Furthermore, as shown in FIG. 5, it is possible to additionally provide a field lens 104, a light modulation device 105 and a projection lens 106 to the lighting apparatus 100 so as to obtain a projection display apparatus of this embodiment.

It is possible to use as the light modulation device 105 a reflective light valve, a transmissive light valve, a mirror panel capable of changing a direction of reflection with small mirrors placed like an array, and the light modulation device of an optical writing method.

Furthermore, while FIGS. 3, 4 and 5 show the lens as the optical means of converting the radiation light from the light source apparatus to illumination light, it may also be the optical means using the mirrors and a prism in addition to the lens or the optical system including an optical component combining multiple lenses.

Furthermore, while FIG. 5 shows the configuration having just one transmissive light valve as the light modulation device, it may also be the configuration having multiple light modulation devices.

Furthermore, although it is not shown, it may be the configuration using the prism, filter and mirror capable of performing color separation and color composition.

As described above, according to the first embodiment, it is possible to have the lamp 11, ellipsoidal mirror 12 and spherical mirror 13 and place the spherical mirror at the position capable of collecting the light not collectable by the ellipsoidal mirror in the form of non-rotation symmetry to the optical axis so as to obtain the light source apparatus of high efficiency and small size.

Furthermore, it is possible, by having such a light source apparatus of high efficiency and small size, to render it brighter by using the lamp of the same power and allow the same brightness by using the lamp of lower power so as to provide the lighting apparatus and projection display apparatus capable of pushing down power consumption.

The above description used the ellipsoidal mirror 12 as the first concave mirror. However, it may be any reflecting surface mirror having a quadratic surface, where a reflecting surface mirror in the form combining a parabolic mirror and multiple ellipsoidal mirrors may also be used. Furthermore, the first concave mirror is not limited to the quadratic surface but may also be formed by multiple planes or curved surfaces, such as a Fresnel mirror.

Furthermore, the spherical mirror is used as the second concave mirror. However, it may be any reflecting surface mirror having a quadratic surface capable of efficiently reflecting lamp radiation light to the proximity of the lamp light-emitting portion, where the reflecting surface mirror in the form combining the ellipsoidal mirror and multiple spherical mirrors may also be used. Furthermore, as with the first concave mirror, it is not limited to the quadratic surface but may also be formed by multiple planes or curved surfaces, such as the Fresnel mirror.

SECOND EMBODIMENT

Figure 8:
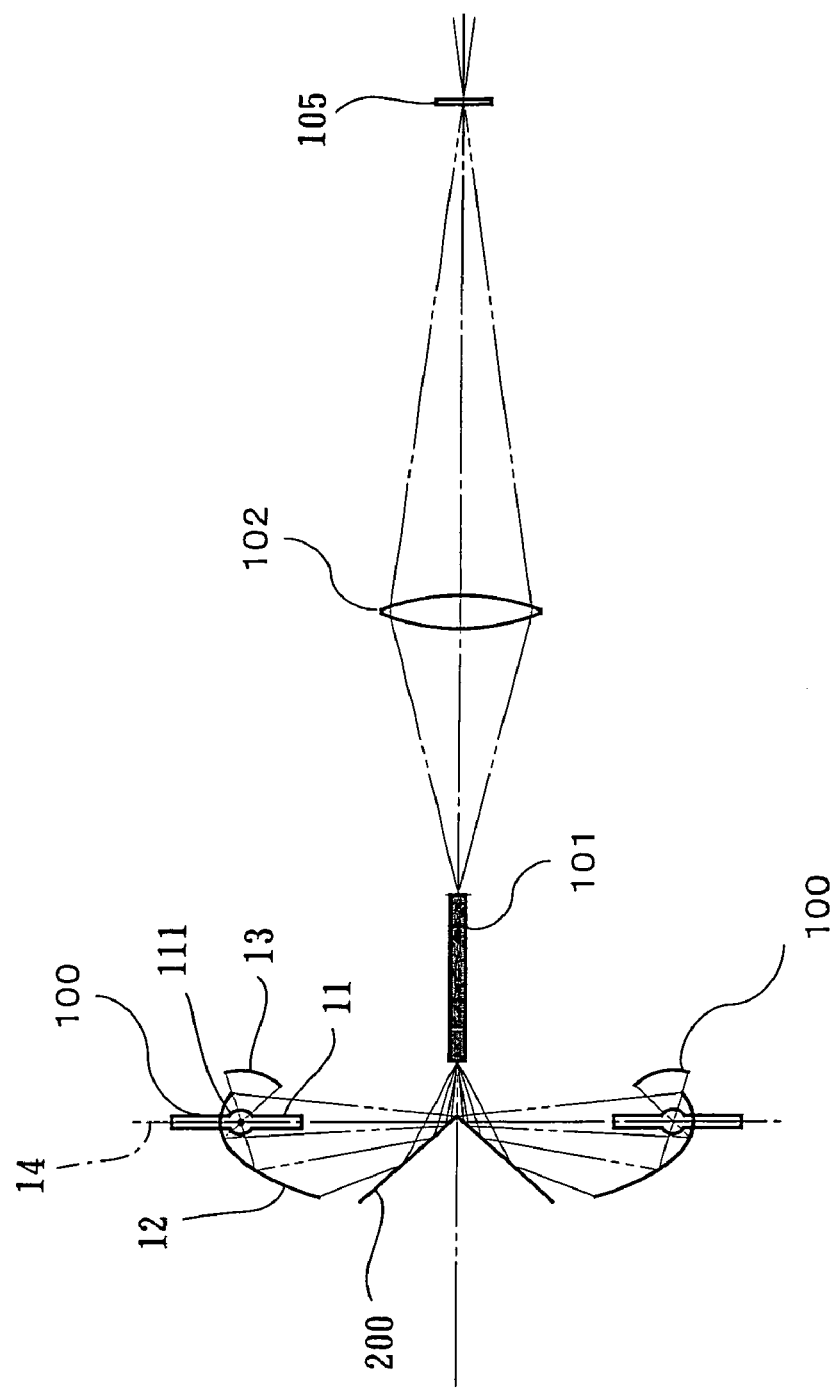
FIG. 8 is a sectional view of describing an overview configuration of the lighting apparatus according to a second embodiment of the present invention.
Figure 10:
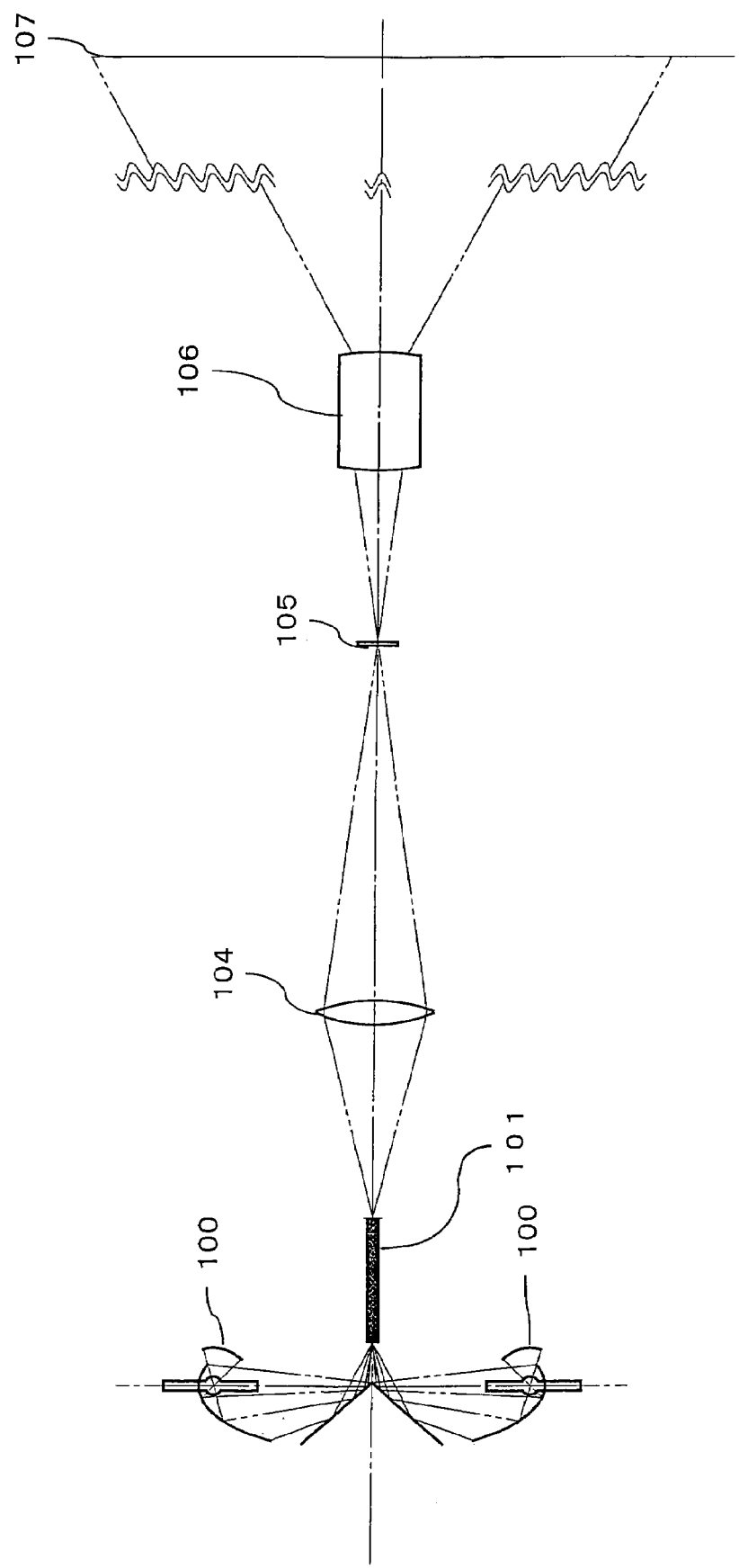
FIG. 10 is a sectional view showing an overview configuration of a projection display apparatus according to the second embodiment of the present invention.

Hereunder, a second embodiment of the present invention will be described by referring to the drawings. FIGS. 8 and 10 show overview configurations of the lighting apparatus and the projection display apparatus according to this embodiment.

The light source apparatus 100 is the same as that in the first embodiment, and so a description thereof will be omitted. As previously described, a multi-lamp optical system as shown in FIG. 11 uses multiple light source apparatuses to be able to perform brighter illumination, combines the luminous fluxes emitted from each of the multiple light source apparatuses and has them incident on one piece of rod integrator or lens optical system to perform the illumination.

Figure 11:
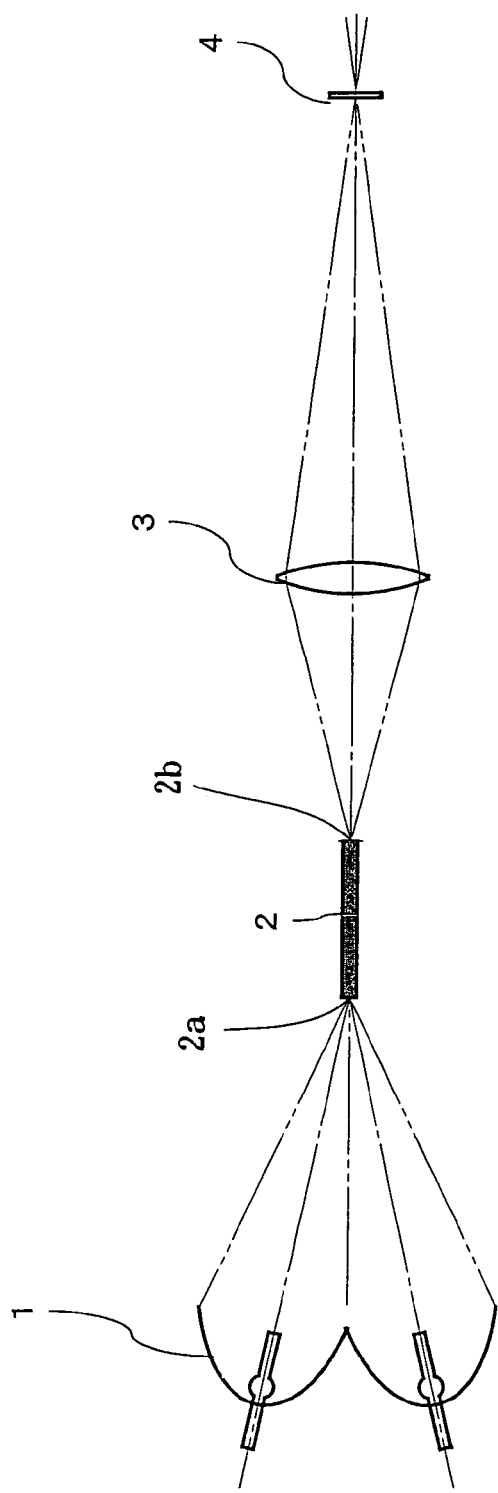
FIG. 11 is a sectional view of an optical system using multiple conventional light source apparatuses.

In the case of the optical system using a rod integrator 2 shown in FIG. 11, it is necessary, for the sake of reducing the loss in the optical system from the rod integrator 2 onward and improving the optical usable efficiency of the luminous fluxes emitted from the light source apparatuses, to render the focusing angle of the ellipsoidal mirror as large as possible and thereby collect more lamp radiation light with the ellipsoidal mirror and further render a distance between the focal position F1 (substantially coinciding with the light source of the lamp) and the focal position F2 (to be the convergent point of the luminous fluxes) of the ellipsoidal mirror 12 as small as possible so as to render the optical spots formed on an incident side opening 2*a* of the rod integrator 2 smaller.

Figure 16:
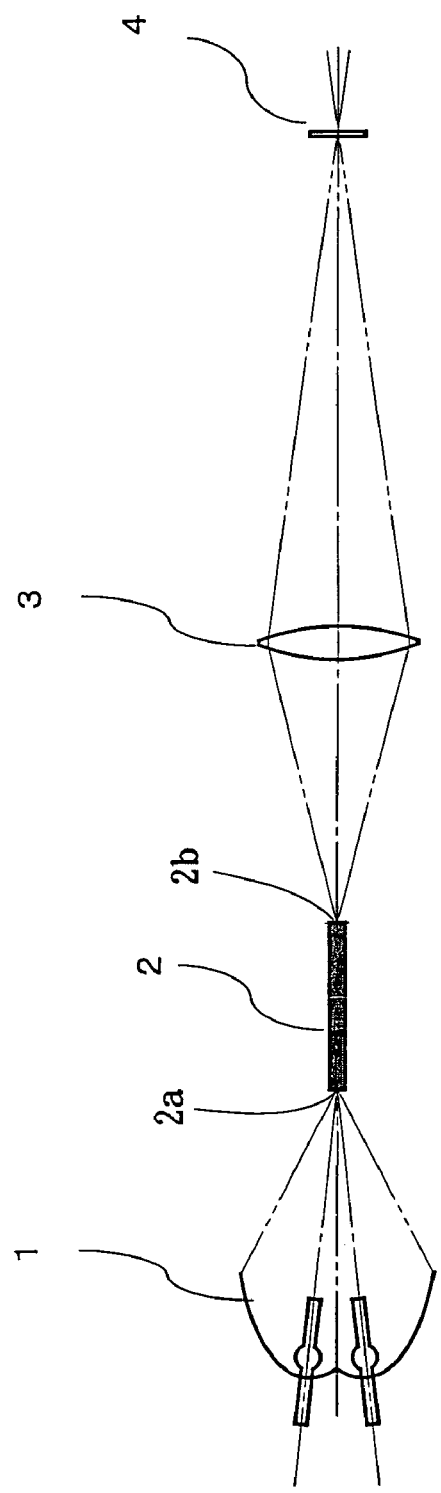
FIG. 16 is a sectional view of the optical system using the multiple conventional light source apparatuses.

In the case of placing multiple ellipsoidal mirrors having their inter-focus distance reduced while rendering the focusing angle larger, it is known that the most efficient placement is that in the state of having a part of the ellipsoidal mirrors physically interfering. As such a configuration, there is the configuration already known as shown in FIG. 16, wherein a part of the concave mirror 1 of each light source apparatus is cut off in order to prevent the concave mirrors 1 of multiple light source apparatuses from physically interfering with one another. In this case, however, there is a problem that the light collection efficiency is lower only in a cut-off portion of the concave mirrors 1.

Figure 13:
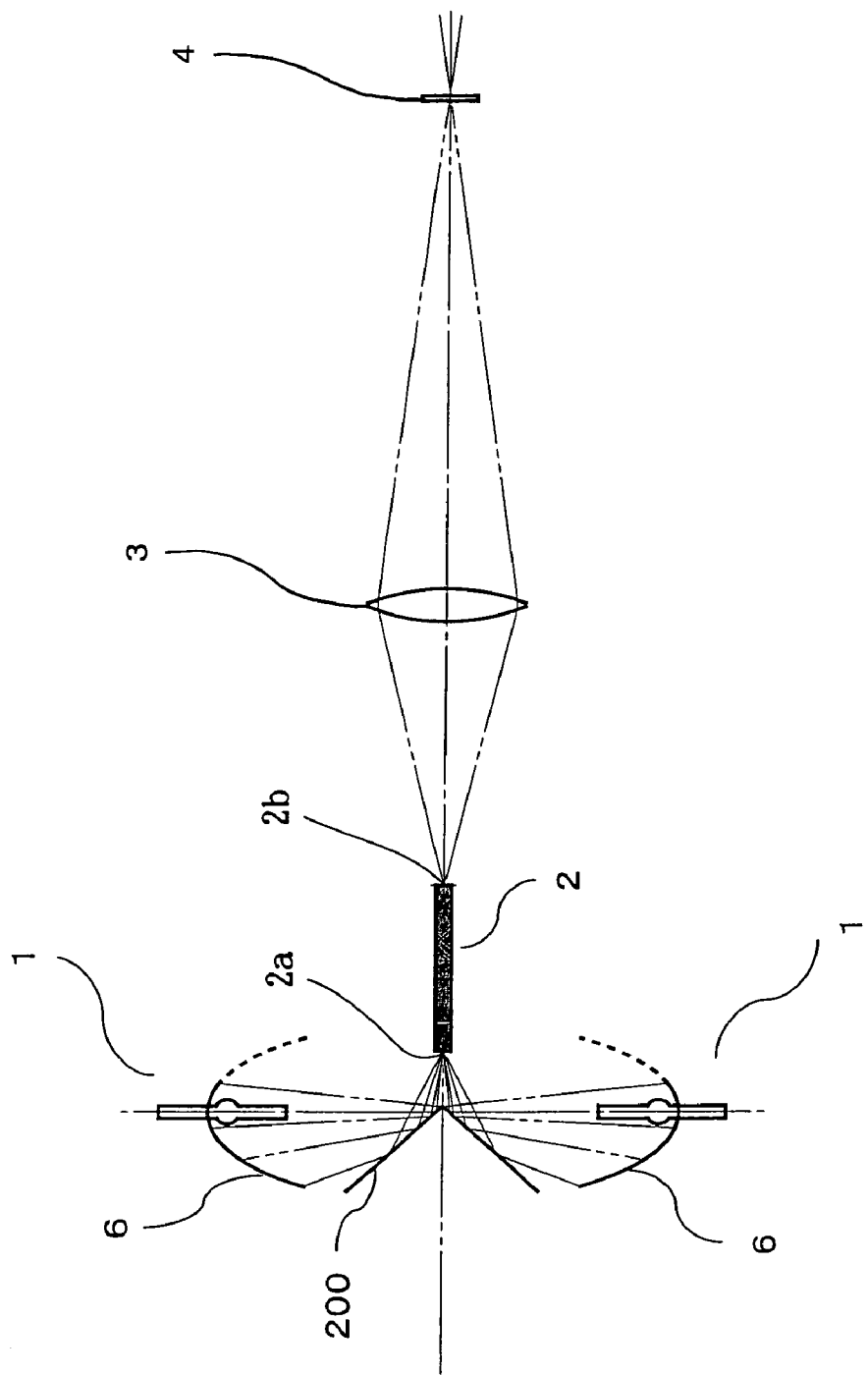
FIG. 13 is a schematic view of describing an effect of the optical system using a mirror for a composite portion of multiple conventional light source apparatuses.

To avoid this problem, there is a configuration, as shown in FIG. 13, in which a pair of light source apparatuses is placed to have their reflection planes opposed to each other and there is a mirror 200 placed immediately anterior to the incident side opening 2*a* of the rod integrator 2 at an angle of guiding the luminous fluxes emitted from multiple light source apparatuses 1 to the incident side opening 2*a* of the rod integrator 2.

In the case of this configuration, there is no physical interference of the concave mirror 1 itself. If the mirror 200 is placed to reflect all the luminous fluxes emitted from the concave mirror 1 onto the rod integrator 2 side, however, there are the luminous fluxes not reflected on the incident side opening 2*a* due to the physics interference of the mirror 200 so that the concave mirror 1 is not substantially used in certain areas (indicated by dotted lines in FIG. 13). In this case, the ellipsoidal mirror has no interfering portion, and so the light incident on a mirror interfering portion is not consequently used even though the ellipsoidal mirror in rotation symmetry to the optical axis can be placed.

Figure 12:
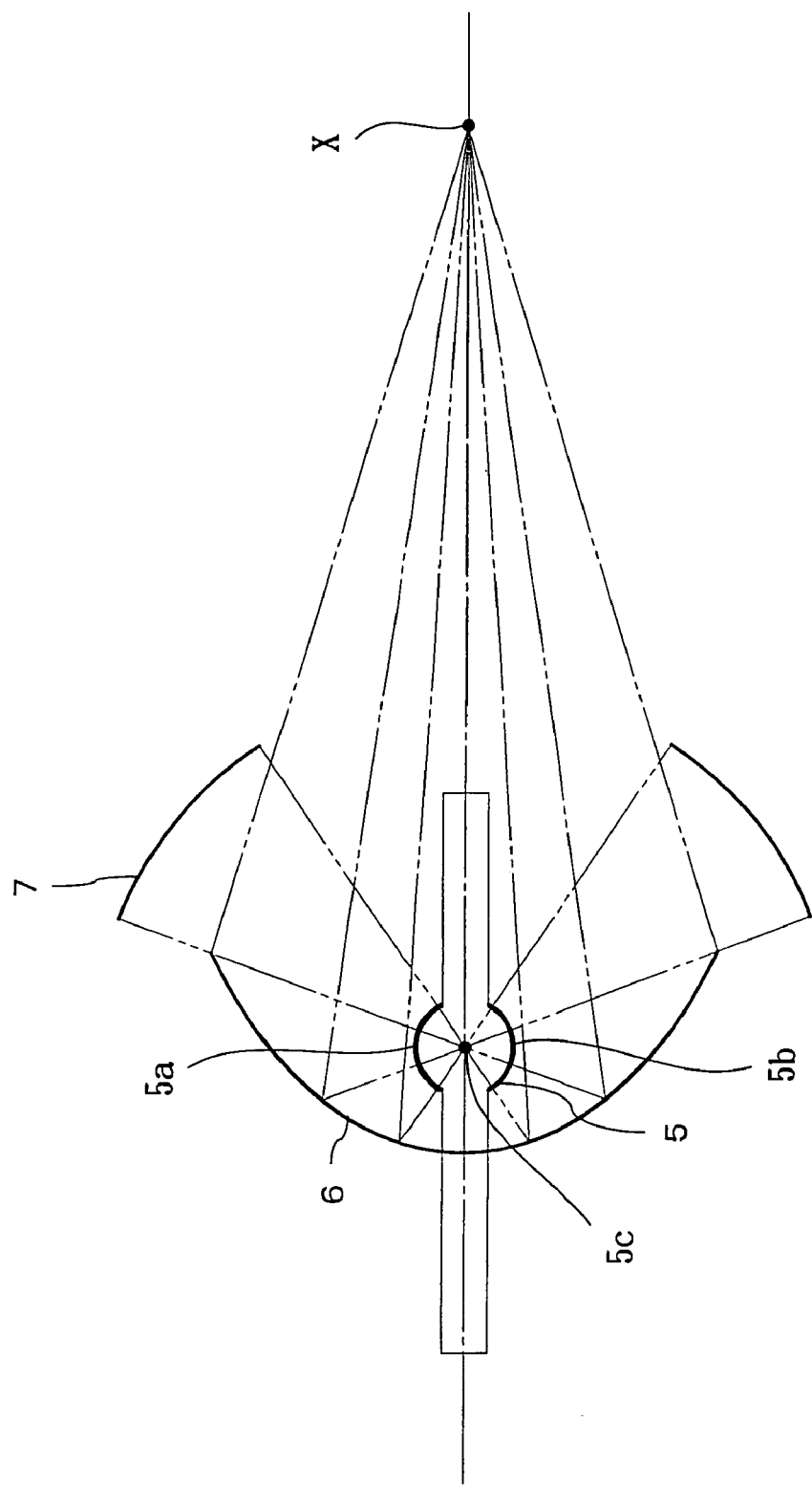
FIG. 12 is a sectional view of the light source apparatus using multiple concave mirrors shown as a first conventional example.
Figure 14:
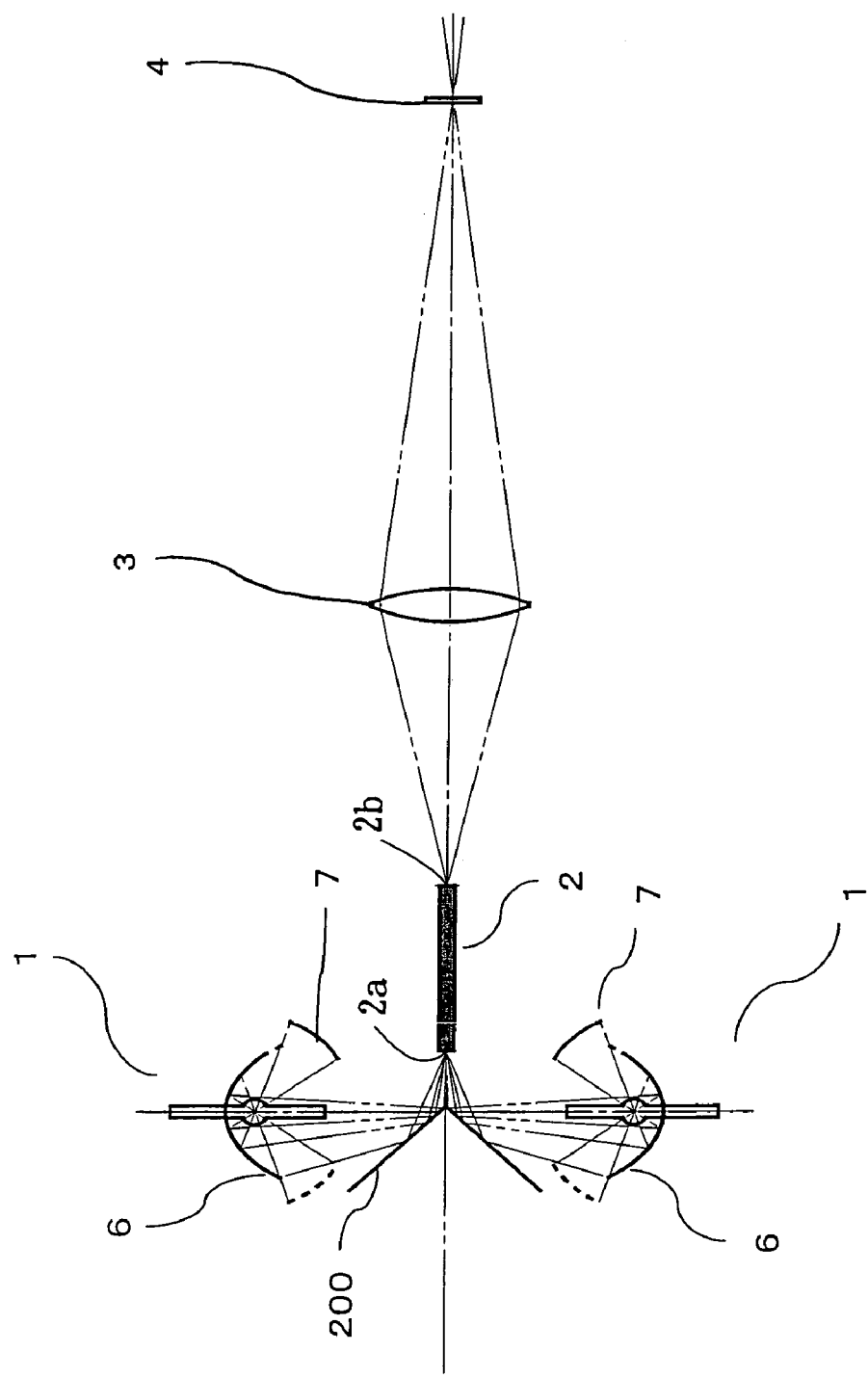
FIG. 14 is a schematic view of describing an effect of the optical system using the mirror for the composite portion of the multiple conventional light source apparatuses of the first conventional example.

Next, FIG. 14 is a diagram showing the configuration of a multi-lamp optical system using the light source apparatus of a conventional configuration as in FIG. 12 as the light source apparatus of the optical system of FIG. 13. In this case, there are areas of the first concave mirror 6 not substantially used (indicated by the dotted lines in FIG. 13) as with the concave mirror of FIG. 13. There are the luminous fluxes further reflected on a second concave mirror 7 and then passing through the proximity of the light-emitting portion and getting incident on the area of the first concave mirror 6 not substantially used in addition to the luminous fluxes directly getting incident on the area of the first concave mirror 6 not substantially used from the lamp. Therefore, it has the problem that the optical usable efficiency is further lowered.

Figure 15:
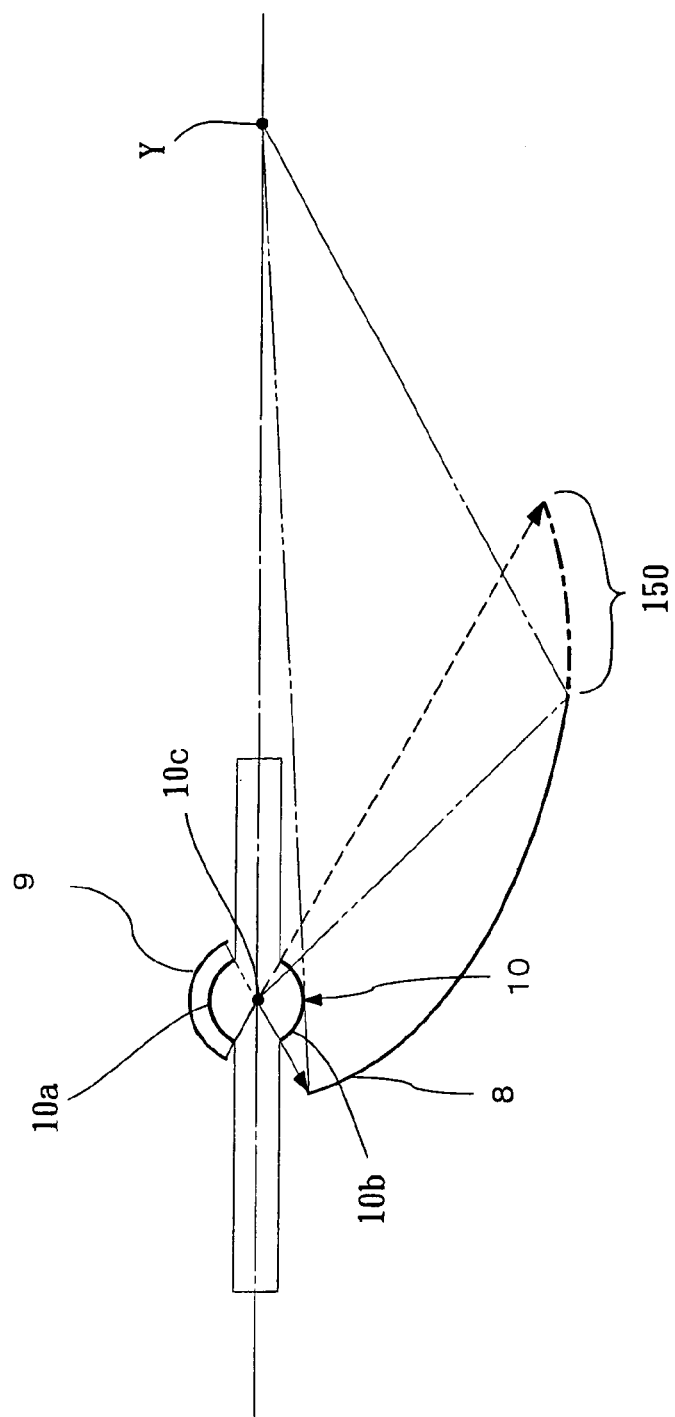
FIG. 15 is a sectional view of the light source apparatus using the multiple concave mirrors shown as a second conventional example.

Furthermore, in the case of using the conventional light source apparatus as in FIG. 15 as a light source apparatus portion of FIG. 13, even the luminous fluxes which can be directly taken in by an ellipsoidal mirror 8 are reflected on a spherical mirror 9 generating a light loss and then pass through the proximity of the light-emitting portion and get reflected on the ellipsoidal mirror 8. Therefore, the luminous fluxes emitted from the light source apparatus cannot be used with maximum efficiency.

The lighting apparatus according to the second embodiment of the present invention solves the above problems by using the light source apparatus of the first embodiment as the lighting apparatus.

FIG. 8 shows the lighting apparatus of the multi-lamp optical system according to the second embodiment of the present invention using the light source apparatus of the first embodiment of the present invention.

In the lighting apparatus, each light source apparatus 100 is placed so that the optical axes 14 coincide in the same plane to be on the same line in FIG. 8.

The light source apparatus 100 is placed to orient a smaller reflection plane of the ellipsoidal mirror 12 toward an unused part of the portion interfered with by the mirror 200 and have a spherical mirror 1 positioned in the unused part. The mirror 200 is equivalent to light guiding means of the present invention.

In the case of such a lighting apparatus, the radiation light from the lamp 11 incident on the spherical mirror 13 is returned to pass through the vicinity of the lamp light-emitting portion 111, and is emitted thereafter onto the mirror 200 side via the reflection plane of the ellipsoidal mirror 12 capable of being used by the mirror 200 and the rod integrator 101. Therefore, it becomes the luminous fluxes suffering no loss after the rod integrator 101 so as to improve the optical usable efficiency of the luminous fluxes emitted from the light source apparatus.

To be more specific, on a specific section of the light source apparatus 100 including a luminescence center (equivalent to the focal position F1) on which the angle of viewing the spherical mirror 13 from the luminescence center is substantially the largest, the position of providing the reflection plane having the smallest angle (corresponding to an angle β shown in FIGS. 6 and 7) of the focusing angles of the ellipsoidal mirror 12 to the optical axis 14 is placed to approximately coincide with the position in the luminous flux closest to an adjacent luminous flux emitted from one of the light source apparatuses when the luminous fluxes emitted from the two light source apparatuses 100 come close before getting incident on the rod integrator 101. Thus, the number of effective luminous fluxes directly collectable from the lamp light-emitting portion 111 by the ellipsoidal mirror 12 becomes the largest. It is also possible, with the spherical mirror 13, to collect the luminous fluxes from the lamp light-emitting portion 111 not collectable by the ellipsoidal mirror 12.

As for this configuration, in the case of using the metal halide lamp or the mercury lamp as the lamp 11, the loss occurs due to light absorption and light scattering of light-emitting materials and materials configuring the lamp 11. However, the light having passed through the vicinity of a luminous body without being absorbed or scattered, even though not all of the luminous fluxes reflected on the spherical mirror 13, reaches the ellipsoidal mirror 12. Furthermore, the light collection efficiency as the light source apparatus is improved because of the ellipsoidal mirror 12 having the reflection plane formed in non-rotation symmetry to the optical axis 14 and astride the optical axis 14. Therefore, the radiation light from the lamp 11 unusable so far can be used so as to improve the optical usable efficiency as the lighting apparatus.

It is also possible, of the luminous fluxes emitted from the lamp light-emitting portion 111, to obtain a larger number of luminous fluxes by direct light collection with the ellipsoidal mirror 12 as the shortest path and collect the remaining luminous fluxes via the spherical mirror 13 so as to significantly improve the light collection efficiency.

It is also possible, as with the first embodiment, to render the radius of curvature R of the spherical mirror 13 shorter than the focal length L of the ellipsoidal mirror 12 and thereby reduce the size of the light source apparatus 100 itself so as to miniaturize the entire lighting apparatus.

If the spherical mirror 13 is miniaturized, the focal length L of the ellipsoidal mirror 13 can also be reduced. Therefore, it is possible to form a smaller optical spot for an incident side opening end 101a of the rod integrator 101 so as to improve the light collection efficiency from the rod integrator 101 onward.

Thus, according to this embodiment, it is possible to obtain the lighting apparatus capable of realizing both high optical usable efficiency and miniaturization.

Figure 17:
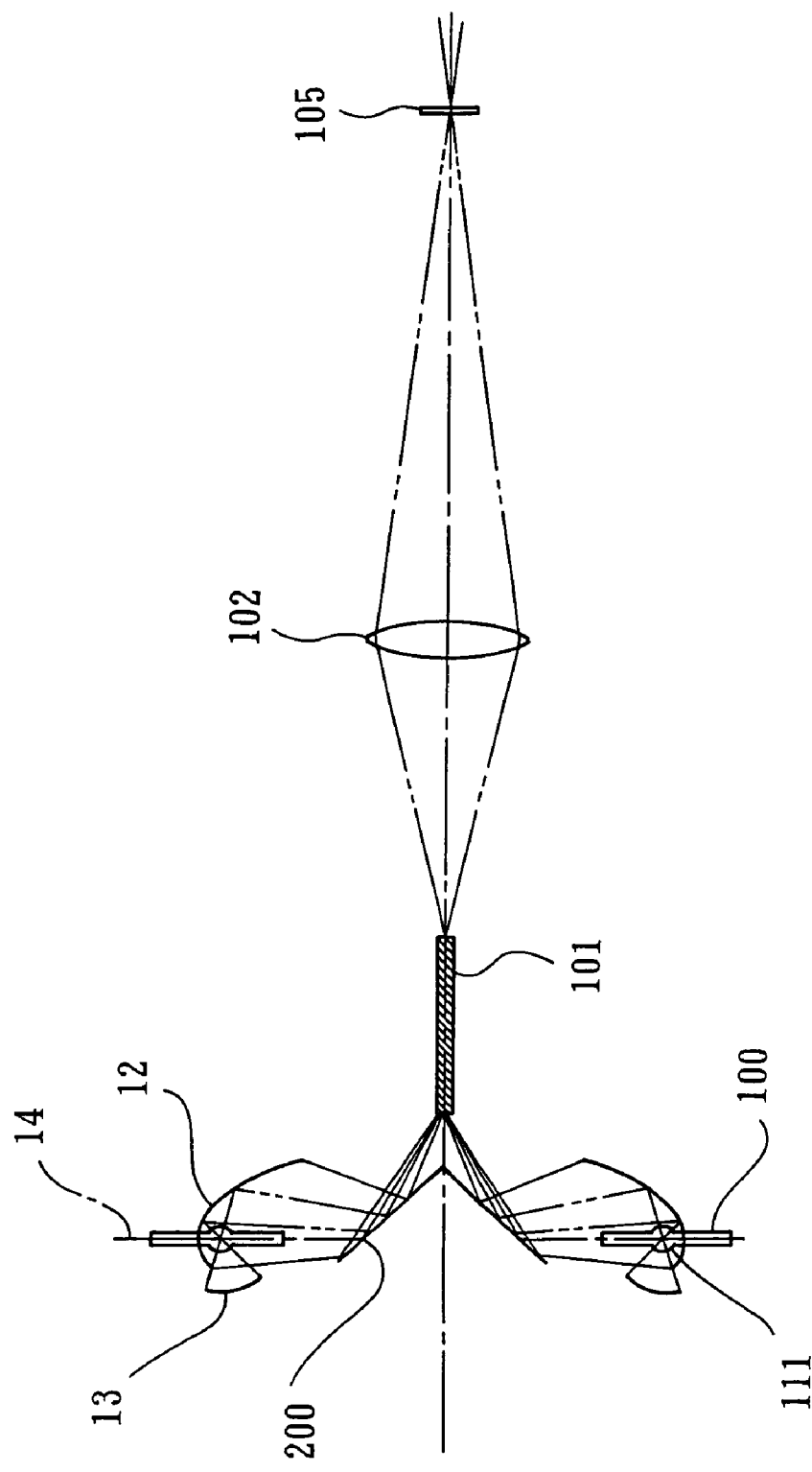
FIG. 17 is a sectional view of describing an overview configuration of the lighting apparatus according to the second embodiment of the present invention.

FIG. 8 shows the example in which the light source apparatus 100 is placed to orient a smaller reflection plane of the ellipsoidal mirror 12 toward an unused part of the portion interfered with by the mirror 200 and have a spherical mirror 1 positioned in the unused part. As shown in FIG. 17, however, it is also feasible to place each light source apparatus 100 so as to reverse positional relation between the ellipsoidal mirror 12 and the spherical mirror 13. In this case, it is necessary, for the sake of preventing the interference of the mirror 200, to take a larger distance between the light source apparatus 100 and the rod integrator 101. There is an advantage, however, that it becomes easier to hold the spherical mirror 13 and place members such as an adjusting jig.

FIG. 8 shows the lighting apparatus using the rod integrator 101 made of glass poles or mirrors glued together as an example. However, it may also be the lighting apparatus using the lens array 103 having multiple lenses two-dimensionally placed as shown in FIG. 9.

Furthermore, as shown in FIG. 10, it is possible to additionally provide the field lens 104, light modulation device 105 and projection lens 106 to the lighting apparatus so as to obtain a projection display apparatus according to this embodiment.

It is possible to use as the light modulation device 105 the reflective light valve, the transmissive light valve and the light modulation device of an optical writing method.

Figure 9:
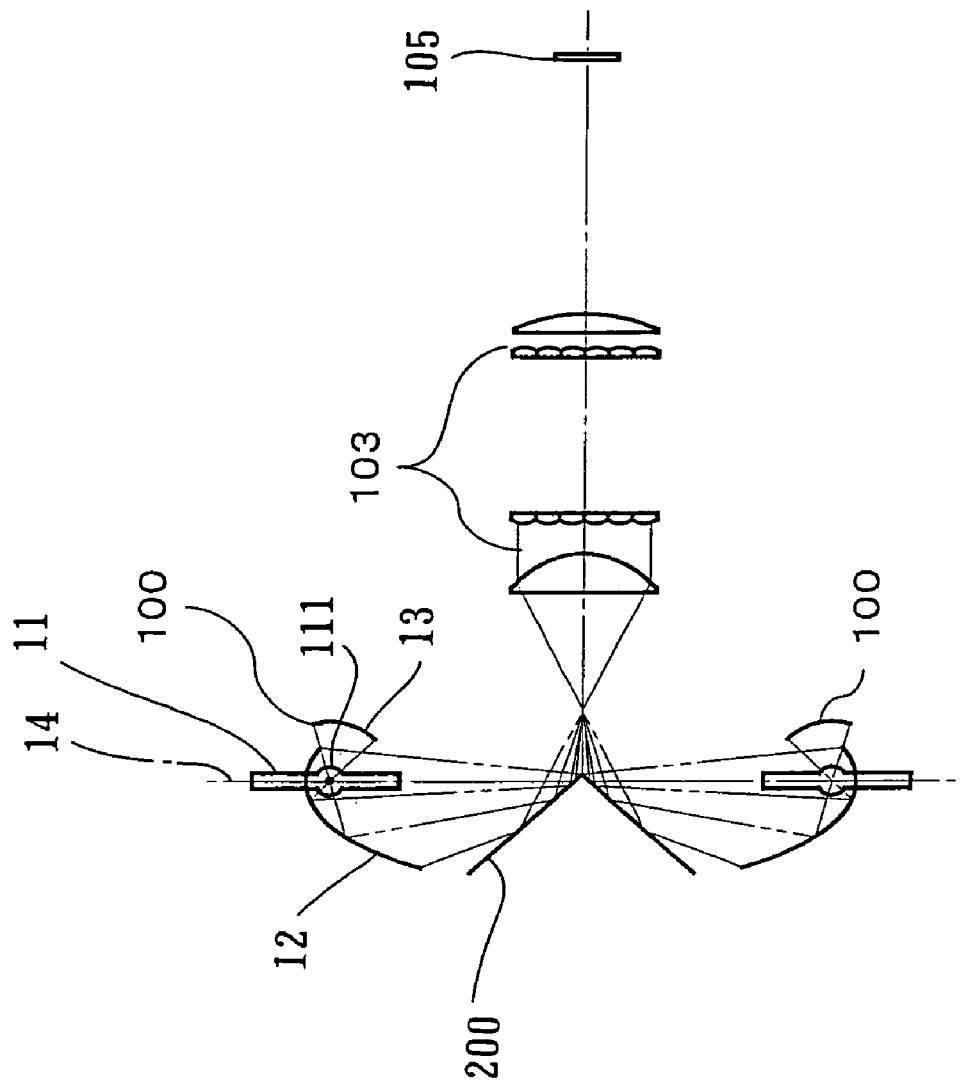
FIG. 9 is a sectional view of describing an overview configuration of the lighting apparatus according to the second embodiment of the present invention.

Furthermore, while FIGS. 8, 9 and 10 show the lens as the optical means of converting to the illumination light, it may also be the optical means using the mirrors and prism in addition to the lens or the optical system including an optical component combining multiple lenses.

Furthermore, while FIGS. 5 and 8 to 10 show the configuration having just one transmissive light valve as the light modulation device, it may also be the configuration having multiple light modulation devices. Furthermore, although it is not shown, it may be the configuration using the prism, filter and mirror capable of performing color separation and color composition.

As described above, according to the second embodiment, it is possible, on the lighting apparatus using multiple light source apparatuses having the lamp, ellipsoidal mirror and spherical mirror, to place the spherical mirror at the position capable of collecting the light not collectable by the ellipsoidal mirror in the form of non-rotation symmetry to the optical axis so as to obtain the light source apparatus of high efficiency.

Furthermore, it is possible, by thus having the light source apparatus of high efficiency, to render it brighter by using the lamp of the same output and allow the same brightness by using the lamp of lower output so as to provide the projection display apparatus capable of pushing down the power consumption.

THIRD EMBODIMENT

Figure 18:
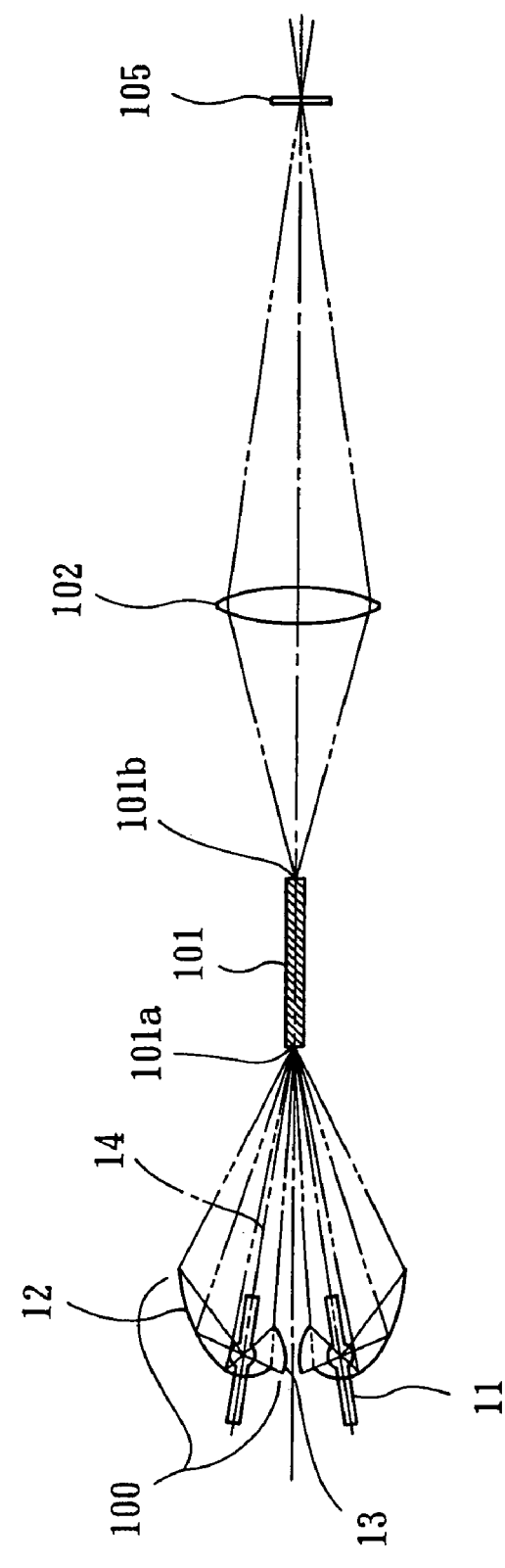
FIG. 18 is a sectional view of describing an overview configuration of the lighting apparatus according to a third embodiment of the present invention.

FIG. 18 shows the configuration of the lighting apparatus according to a third embodiment of the present invention. In FIG. 18, the rod integrator 101, a relay lens 102 and the light modulation device 105 are the same as the conventional examples and the second embodiment. To be more specific, it has the configuration in which the light source apparatus according to the first embodiment is used as the light source apparatus of the lighting apparatus of the conventional example shown in FIG. 11. In this case, the pair of light source apparatuses 100 is placed to have their spherical mirrors 13 opposed to each other, and the rod integrator 101 is placed at an intersection which is a point in space at which the optical axes 14 of the light source apparatuses 100 intersect.

The lighting apparatus of this embodiment has the same optical operation as the conventional example of FIG. 11. It uses the light source apparatuses of the first embodiment as the pair of light source apparatuses 100, and the luminous fluxes emitted from the light source apparatuses 100 directly reach the incident side opening end 101a of the rod integrator 101.

When compared to the configuration of the second embodiment, the optical axes 14 of the light source apparatuses of this embodiment are oblique as with the conventional examples, and so a problem remains, such as difficulty in adjustment of optical axis fitting. It is possible, however, to radiate all the luminous fluxes in non-rotation symmetry to the optical axis 14 to the rod integrator 101. Thus, as with the conventional example shown in FIG. 16, it is feasible, by using the light source apparatus of a small inter-focus distance, to render the focusing angle of the radiation light from the lamp 11 close to the angle of the light source apparatuses in rotation symmetry of the conventional example shown in FIG. 11 while rendering the optical spot formed by the rod integrator 101 smaller so as to obtain high optical usable efficiency as the entire optical system.

It is also possible to simplify the number of parts and reduce the cost.

Figure 19:
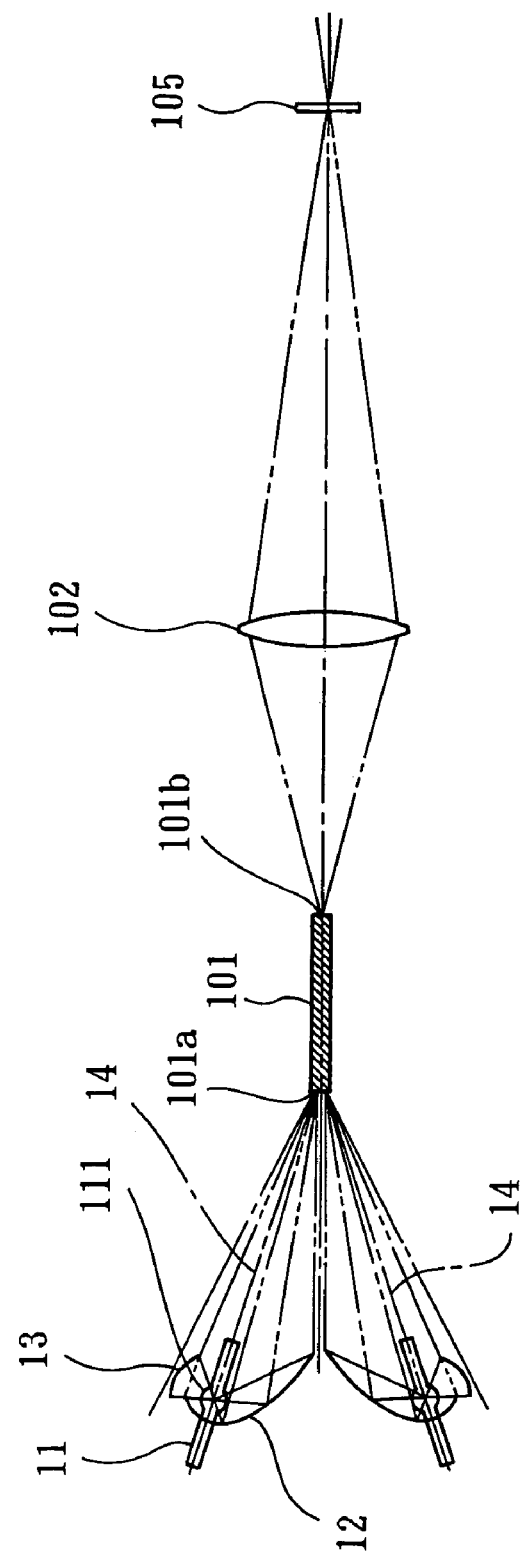
FIG. 19 is a sectional view of describing an overview configuration of the lighting apparatus according to the third embodiment of the present invention.

FIG. 18 shows the configuration of placing the pair of light source apparatuses 100 to have the spherical mirrors 13 opposed to each other. It is also possible, as shown in FIG. 19, to place them to have the ellipsoidal mirrors 12 opposed to each other. In this case, it is feasible, of the luminous fluxes incident on the rod integrator 101, to intensively have the luminous fluxes substantially almost parallel to the optical axis of the rod integrator 101 incident on the incident side opening end 101a and increase a substantial amount of luminous fluxes from the rod integrator 101 onward in the lighting apparatus. Furthermore, there is also the advantage that it becomes easier to hold the spherical mirror 13 and place the members such as an adjusting jig.

According to the above description, the ellipsoidal mirror is used as the first concave mirror. However, it may be any reflecting surface mirror having a quadratic surface, where a reflecting surface mirror in the form combining the parabolic mirror and multiple ellipsoidal mirrors may also be used.

Furthermore, the spherical mirror is used as the second concave mirror. However, it may be any reflecting surface mirror having a quadratic surface capable of efficiently reflecting the lamp radiation light to the proximity of the lamp light-emitting portion, where the reflecting surface mirror in the form combining the ellipsoidal mirror and multiple spherical mirrors may also be used.

As previously described, in the above embodiments, the lamp 11 is an example of the lamp or light generating means of the present invention, the spherical vessel portion of the lamp light-emitting portion 111 except the source of luminescence is an example of the spherical vessel portion of the present invention, the ends 111c and 111d are an example of the pair of ends of the present invention, the light transmission plane 111a of the lamp light-emitting portion 111 is an example of a first opposed plane of the present invention, and the light transmission plane 111b is an example of a second opposed plane of the present invention.

However, the light generating means of the present invention does not need to be implemented as the lamp having the vessel body as in the embodiments. It may also be implemented by another light source such as a light-emitting diode. In the case where it is the lamp, it does not have to be configured by the spherical vessel portion and the ends. For instance, it may also be in a substantially spherical or ellipsoidal form consisting only of the spherical vessel portion having the light transmission plane. In short, the light generating means of the present invention is not limited by its concrete configuration and form as long as its source of luminescence can form the focus of the first concave mirror and the reference axis of the present invention.

As described above, according to the present invention, it is possible to provide the light source apparatus capable of realizing high optical usable efficiency which is not lowered by miniaturizing it and also provide the lighting apparatus and projection display apparatus of high optical usable efficiency by having the light source apparatus.

The invention claimed is:

1. A light source apparatus comprising:
light generating means;
a first concave mirror of collecting a part of light radiated from the light generating means; and
a second concave mirror of collecting another part of the light radiated from the light generating means not collected by the first concave mirror and reflecting it on the first concave mirror,
wherein a reflection plane of the first concave mirror and a reflection plane of the second concave mirror are in a form of non-rotation symmetry to a reference axis connecting a source of luminescence of the light generating means to a focus of the light collected by the first concave mirror respectively;
a distance between the reflection plane of the second concave mirror and the source of luminescence is shorter than the distance between the source of luminescence and the focus of the light collected by the first concave mirror;
a part of the reflection plane of the first concave mirror is formed around the reference axis; and
the second concave mirror is placed substantially outside luminous fluxes formed by having the light of the light generating means reflected on the first concave mirror,
wherein the reflection plane of the first concave mirror is located closer to the source of luminescence than the reflection plane of the second concave mirror; and
the following relations are satisfied if, when a focusing angle of the first concave mirror is divided in two by a plane including the reference axis, a larger angle is α, a smaller angle is β, a maximum angle of the light radiated from the light generating means to the first concave mirror and the second concave mirror is γ, and the focusing angle of the second concave mirror is θ:

$$\alpha > \beta > 0 \quad \text{(Formula 1)}$$

$$\alpha + \beta \geq 180 \text{ degrees} \quad \text{(Formula 2)}$$

$$0 < \leq \gamma - \beta. \quad \text{(Formula 3)}$$

2. A light source apparatus comprising:
light generating means;
a first concave mirror of collecting a part of light radiated from the light generating means; and
a second concave mirror of collecting another part of the light radiated from the light generating means not collected by the first concave mirror and reflecting it on the first concave mirror,
wherein a reflection plane of the first concave mirror and a reflection Diane of the second concave mirror are in a form of non-rotation symmetry to a reference axis connecting a source of luminescence of the light generating means to a focus of the light collected by the first concave mirror respectively;
a distance between the reflection plane of the second concave mirror and the source of luminescence is shorter than the distance between the source of luminescence and the focus of the light collected by the first concave mirror;
a part of the reflection plane of the first concave mirror is formed around the reference axis; and
the second concave mirror is placed in luminous fluxes formed by having the light of the light generating means reflected on the first concave mirror,
wherein the reflection plane of the second concave mirror is located closer to the source of luminescence than the reflection plane of the first concave mirror; and
the following relations are satisfied if, when a focusing angle of the first concave mirror is divided in two by a plane including the reference axis, a larger angle is α, a smaller angle is β, a maximum angle of the light radiated from the light generating means to the first concave mirror and the second concave mirror is γ, and the focusing angle of the second concave mirror is θ:

$$\alpha > \beta > 0 \quad \text{(Formula 1)}$$

$$\alpha + \beta \geq 180 \text{ degrees} \quad \text{(Formula 2)}$$

$$0 < \theta \leq 180 \text{ degrees}. \quad \text{(Formula 4)}$$

3. The light source apparatus according to claim 1 or claim 2, wherein the first concave mirror has one or a plurality of quadratic surfaces as the reflection plane.

4. The light source apparatus according to claim 3, wherein the quadratic surface of the first concave mirror is a part of an ellipsoidal surface, and one of the focuses of the ellipsoidal surface substantially coincides with the source of luminescence of the light generating means while the other coincides with the focus of the light collected by the first concave mirror.

5. The light source apparatus according to claim 1 or claim 2, wherein the second concave mirror has one or a plurality of quadratic surfaces as the reflection plane.

6. The light source apparatus according to claim 5, wherein the quadratic surfaces of the second concave mirror are a part of a spherical surface and a center of the spherical surface substantially coincides with the source of luminescence of the light generating means.

7. The light source apparatus according to claim 1 or claim 2, wherein
the light generating means is a lamp having a vessel body of accommodating the source of luminescence;
the vessel body has a spherical vessel portion of transmitting radiation light from the source of luminescence and a pair of ends projecting from the spherical vessel portion; and
the pair of ends is provided around the reference axis.

8. The light source apparatus according to claim 7, wherein the spherical vessel portion has a first opposed plane opposed to the reflection plane of the first concave mirror and a second opposed plane opposed to the reflection plane of the first concave mirror and the reflection plane of the second concave mirror; and
the part of the reflection plane of the first concave mirror is at least opposed to the second opposed plane.

9. A lighting apparatus comprising:
the light source apparatus according to claim 1 or claim 2; and
lens means placed at a position optically connecting with the focus of the light collected by the first concave mirror of the light source apparatus and converting the light emitted from the light source apparatus substantially to parallel light,
wherein the light source apparatus is one of a plurality of light source apparatus which are placed so that the respective reference axes thereof intersect at one point in space; and
the lens means is provided at a position corresponding to the one point.

10. The lighting apparatus according to claim 9, wherein the lens means is a rod integrator.

11. The lighting apparatus according to claim 9, wherein the lens means is a lens array.

12. The lighting apparatus according to claim 9, wherein there are a plurality of the light source apparatuses placed so that the respective reference axes thereof coincide in the same plane; and
it further comprises light guiding means of guiding the light emitted from the plurality of light source apparatus to the lens means.

13. The lighting apparatus according to claim 9, wherein the plurality of light source apparatus are placed so that the second concave mirrors are mutually opposed.

14. The lighting apparatus according to claim 9, wherein the plurality of light source apparatus are placed so that the first concave mirrors are mutually opposed.

* * * * *

UNITED STATES PATENT AND TRADEMARK OFFICE
CERTIFICATE OF CORRECTION

PATENT NO. : 7,213 944 B2 Page 1 of 1
APPLICATION NO. : 10/553489
DATED : May 8, 2007
INVENTOR(S) : Yusaku Shimaoka et al.

It is certified that error appears in the above-identified patent and that said Letters Patent is hereby corrected as shown below:

Column 18
Line 11,
change "$0 < \leq \gamma - \beta$    (Formula 3)"
to -- $0 < \theta \leq \gamma - \beta$    (Formula 3) --

Column 18
Line 22
change "Diane" to -- plane --

Signed and Sealed this

Eleventh Day of December, 2007

JON W. DUDAS
*Director of the United States Patent and Trademark Office*